(12) United States Patent
Sakurai et al.

(10) Patent No.: US 8,419,952 B2
(45) Date of Patent: Apr. 16, 2013

(54) METHOD OF MANUFACTURING MAGNETIC RECORDING MEDIUM AND MAGNETIC RECORDING APPARATUS

(75) Inventors: Masatoshi Sakurai, Tokyo (JP); Kaori Kimura, Yokohama (JP); Hiroyuki Hyodo, Hino (JP); Takeshi Iwasaki, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 51 days.

(21) Appl. No.: 13/166,718

(22) Filed: Jun. 22, 2011

(65) Prior Publication Data

US 2012/0052328 A1 Mar. 1, 2012

(30) Foreign Application Priority Data

Sep. 1, 2010 (JP) ................. 2010-196050

(51) Int. Cl.
*B44C 1/22* (2006.01)
(52) U.S. Cl.
USPC .......... 216/22; 216/41; 216/58; 216/62; 216/63; 216/66; 438/3; 438/689; 438/706; 428/800; 428/810
(58) Field of Classification Search ............. None
See application file for complete search history.

(56) References Cited

U.S. PATENT DOCUMENTS

| | | | |
|---|---|---|---|
| 2009/0213497 A1* | 8/2009 | Ono et al. ............ | 360/135 |
| 2009/0237838 A1 | 9/2009 | Fukushima et al. | |
| 2010/0053797 A1 | 3/2010 | Fukushima et al. | |

FOREIGN PATENT DOCUMENTS

| | | |
|---|---|---|
| JP | 2006-309841 | 11/2006 |
| JP | 2008-052860 | 3/2008 |
| JP | 2008-077756 | 4/2008 |
| JP | 2010-108551 | 5/2010 |
| JP | 2010-108559 | 5/2010 |
| JP | 2010-123178 | 6/2010 |

OTHER PUBLICATIONS

J.C. Lodder, "Patterned Nanomagnetic Films", in Advanced Magnetic Nanostructure, 2006, pp. 261-293.*
Japanese Office Action for application 2010-196050 mailed on Mar. 21, 2012 in six pages.
Japanese Office Action dated Oct. 18, 2011 in 5 pages for Patent Application No. 2010-196050.

* cited by examiner

*Primary Examiner* — Lan Vinh
*Assistant Examiner* — Jiong-Ping Lu
(74) *Attorney, Agent, or Firm* — Knobbe Martens Olson & Bear LLP

(57) ABSTRACT

According to one embodiment, a method of manufacturing a patterned medium includes forming an implantation depth-adjusting layer above a magnetic recording layer, the magnetic recording layer being made of a material that is deactivated when implanted with a chemical species, and the implantation depth-adjusting layer being made of a material that is etched when irradiated with an ion beam of the chemical species and irradiating the implantation depth-adjusting layer with the ion beam to implant the chemical species into a part of the magnetic recording layer through the implantation depth-adjusting layer while etching the implantation depth-adjusting layer by an action of the ion beam to decrease a thickness of the implantation depth-adjusting layer.

15 Claims, 10 Drawing Sheets

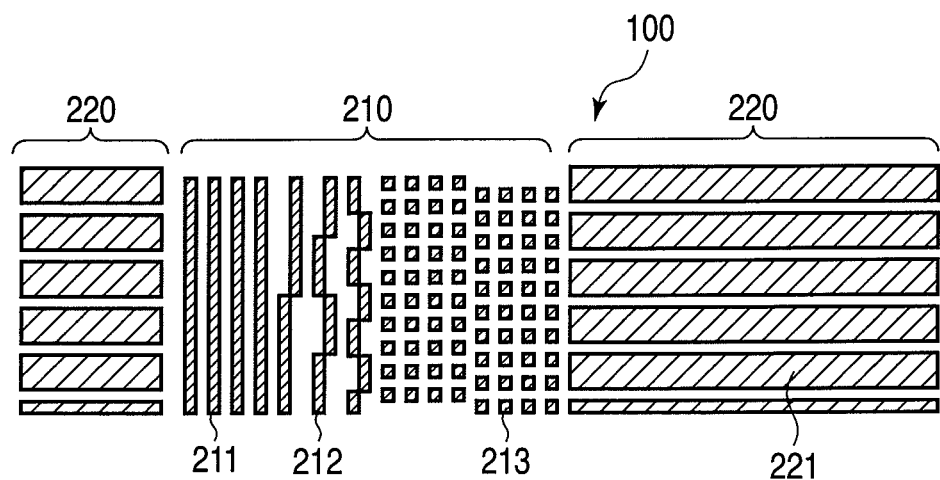
F I G. 1
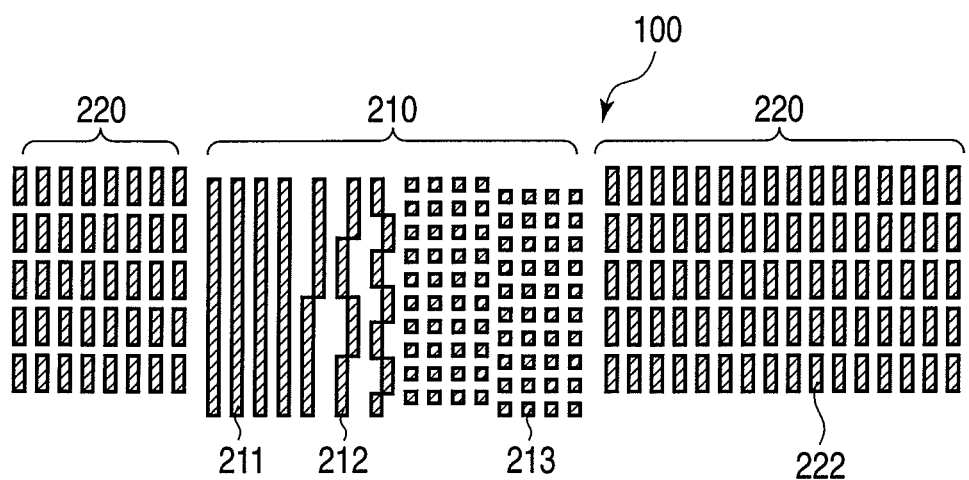
F I G. 2

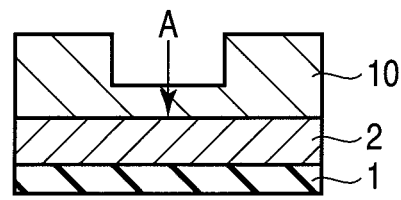
F I G. 6A
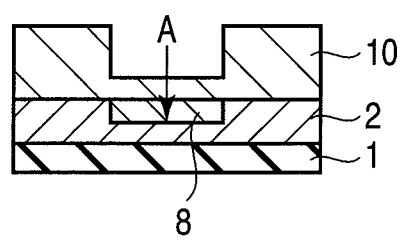
F I G. 6B
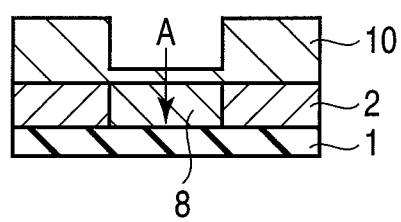
F I G. 6C
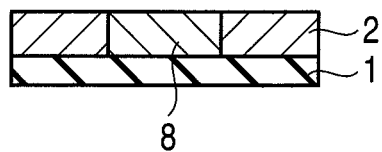
F I G. 6D

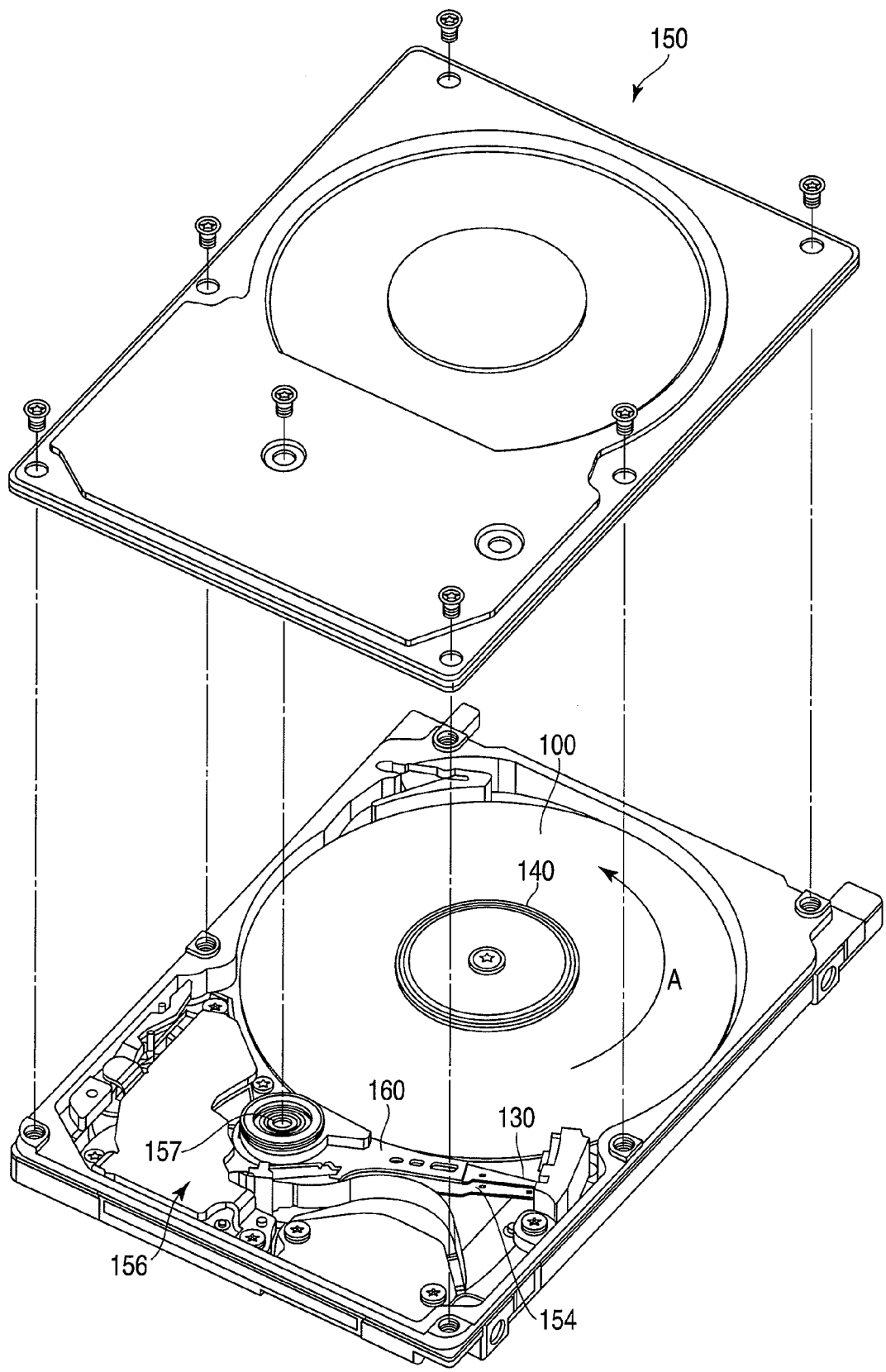
F I G. 13

METHOD OF MANUFACTURING MAGNETIC RECORDING MEDIUM AND MAGNETIC RECORDING APPARATUS

CROSS-REFERENCE TO RELATED APPLICATIONS

This application is based upon and claims the benefit of priority from Japanese Patent Application No. 2010-196050, filed Sep. 1, 2010; the entire contents of which are incorporated herein by reference.

FIELD

Embodiments described herein relate generally to a method of manufacturing a magnetic recording medium such as a patterned medium.

BACKGROUND

In recent years, there has been a demand for an exponential increase in memory capacity of a recording medium such as a hard disk. In order to meet the demand, a magnetic recording medium having high memory capacity is being developed.

In a magnetic recording medium used in conventional hard disks, a predetermined region of a thin film including polycrystals of magnetic fine particles is used as one bit for recording. In order to increase recording capacity of a magnetic recording medium, the recording density should be increased. In other words, it is necessary to reduce the recording mark size which is usable for recording of one bit. However, when the recording mark size is simply reduced, the influence of noise which depends on the shapes of magnetic fine particles becomes nonnegligible. If the particle size of magnetic fine particles is reduced to lower the noise, a problem of thermal fluctuation occurs, which makes it impossible to maintain recorded data at a room temperature.

In order to avoid these problems, a bit patterned medium (BPM) has been proposed, in which the recording material is separated by a nonmagnetic material in advance, and a single magnetic dot is used as a single recording cell to perform read and write.

In magnetic recording media installed in HDDs, there is an arising problem of the interference between adjacent tracks which inhibits improvement in track density. Particularly, reducing a fringe effect of a write head field is a significant technical problem to be solved. To solve this problem, there has been developed a discrete track recording-type patterned medium (DTR medium), in which the magnetic recording layer is processed so that the recording tracks are physically separated from each other. In the DTR medium, it is possible to reduce side erase which erases information in the adjacent tracks in writing and side read which reads information in the adjacent tracks in reading. On this account, the DTR medium is promising as a magnetic recording medium capable of providing a high recording density. Incidentally, it should be noted that the term "patterned medium" as used herein in a broad sense includes the bit patterned medium and DTR medium.

As a method of manufacturing a patterned medium, a technology of forming a pattern of a magnetic region and a nonmagnetic region on a magnetic recording layer by deactivating magnetism of the recording layer has been known. In the technology, it is important to deactivate the magnetism correctly and uniformly on the target region in order to obtain a magnetic recording medium having an excellent pattern.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a plan view taken along a circumferential direction of a discrete track recording (DTR) medium according to one embodiment;

FIG. 2 is a plane view taken along a circumferential direction of a bit-patterned medium (BPM) according to the embodiment;

FIGS. 6A, 6B, 6C, and 6D are sectional views showing a manufacturing method according to the embodiment;

FIG. 13 is a perspective view showing a magnetic recording apparatus to which the magnetic recording medium manufactured according to the embodiment is mounted.

DETAILED DESCRIPTION

Figure 3A:
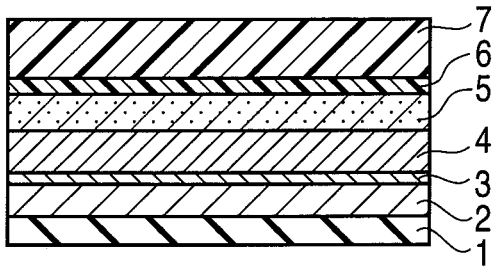
FIGS. 3A, 3B, 3C, 3D, 3E, 3F, 3G, and 3H are sectional views showing a method of manufacturing a magnetic recording medium according to a first embodiment.

Various embodiments will be described hereinafter with reference to the accompanying drawings.

In general, according to one embodiment, a method of manufacturing a patterned medium comprises forming an implantation depth-adjusting layer above a magnetic recording layer, the magnetic recording layer being made of a material that is deactivated when implanted with a chemical species, and the implantation depth-adjusting layer being made of a material that is etched when irradiated with an ion beam of the chemical species and irradiating the implantation depth-adjusting layer with the ion beam to implant the chemical species into a part of the magnetic recording layer through the implantation depth-adjusting layer while etching the implantation depth-adjusting layer by an action of the ion beam to decrease a thickness of the implantation depth-adjusting layer.

[Magnetic Recording Medium]

FIG. 1 shows a plan view of a discrete track recording medium (DTR medium) which is an example of the magnetic recording medium of the embodiment along the circumferential direction. As shown in FIG. 1, servo regions 210 and data regions 220 are alternately formed along the circumferential direction of a patterned medium 100. The servo region 210 includes a preamble section 211, an address section 212 and a burst section 213. The data region 220 includes discrete tracks 221 wherein adjacent tracks are separated from each other.

FIG. 2 shows a plan view of a bit patterned medium (BPM) which is another example of the magnetic recording medium of the embodiment along the circumferential direction. In this magnetic recording medium 100, magnetic dots 222 are formed in the data region 220.

[Manufacturing Method]

First Embodiment

A method of manufacturing a magnetic recording medium according to a first embodiment will be described with reference to FIGS. 3A, 3B, 3C, 3D, 3E, 3F, 3G, and 3H.

As shown in FIG. 3A, a magnetic recording layer 2, a diamond-like-carbon (DLC) layer 3, a first hard mask 4, a second hard mask 5, a third hard mask 6, and a resist 7 are layered on a glass substrate 1. For example, a soft magnetic layer (CoZrNb) (not shown) having at thickness of 40 nm, an orientation controlling underlayer (Ru) (not shown) having a thickness of 20 nm, the magnetic recording layer 2 (CoCrPt—$SiO_2$) having a thickness of 20 nm, the DLC layer 3 having a thickness of 2 nm, the first hard mask (Mo) 4 having a thickness of 30 nm, the second hard mask (C) 5 having a thickness of 30 nm, and the third hard mask (Si) 6 having a thickness of 3 nm are formed on the glass substrate 1. The resist 7 is spin-coated on the third hard mask 6 in such a manner that a thickness thereof becomes 80 nm. As the resist, for example, an ordinary photoresist is used. Meanwhile, a stamper, on which predetermined patterns of protrusions and recesses corresponding to a pattern shown in FIG. 1 or 2 are formed, is prepared. The stamper is prepared by electron beam lithography, nickel electroforming, and injection molding. The stamper is disposed in such a manner that a protrusion-recess surface thereof is opposed to the resist 7.

Figure 3B:
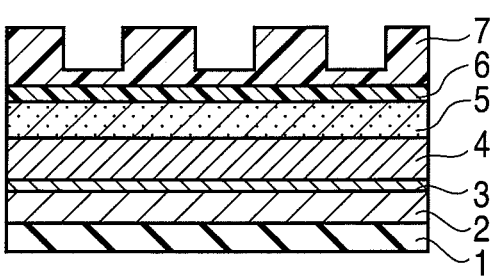

As shown in FIG. 3B, the stamper is imprinted on the resist 7 to print the patterns of protrusions and recesses of the stamper on the resist 7. After that, the stamper is removed. Shown in FIG. 3B is a state in which the stamper is removed after the imprint. A resist residue remains at the bottom of the recesses of the patterns of protrusions and recesses printed on the resist 7.

Figure 3C:
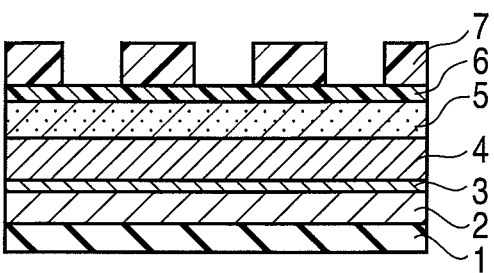

As shown in FIG. 3C, the resist residue in the recesses is removed by dry etching to expose a surface of the third hard mask 6. The step is performed using an inductivity-coupled plasma (ICP) reactive ion etching (RIE) system, for example, using $CF_4$ as a process gas at a chamber pressure of 0.1 Pa and coil RF power and platen RF power of 100 W and 50 W, respectively, for an etching time of 60 seconds.

Figure 3D:
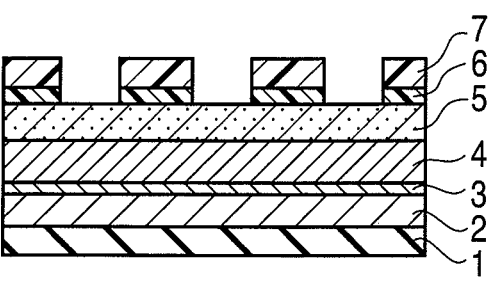

As shown in FIG. 3D, the pattern is printed on the third hard mask 6 by ion beam etching using the patterned resist 7 as a mask to expose the second hard mask 5 at the recesses. The step is performed using an ICP-RIE system, for example, using $CF_4$ as a process gas at a chamber pressure of 0.1 Pa and coil RF power and platen RF power of 100 W and 50 W, respectively, for an etching time of 20 seconds.

Figure 3E:
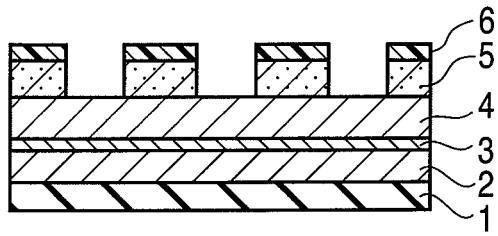

As shown in FIG. 3E, the pattern is printed by etching the second hard mask 5 formed of C by using the patterned third hard mask 6 as a mask to expose a surface of the first hard mask 4 at the recesses. The step is performed using an ICP-RIE system, for example, using $O_2$ as a process gas at a chamber pressure of 0.1 Pa and coil RF power and platen RF power of 100 W and 50 W, respectively, for an etching time of 30 seconds.

Figure 3F:
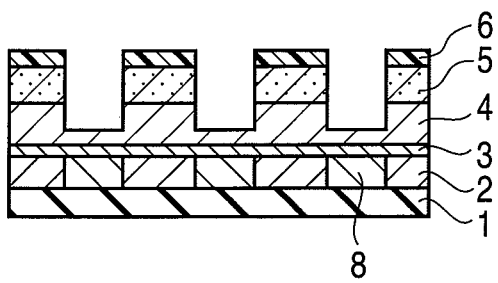

As shown in FIG. 3F, regions of the magnetic recording layer 2 corresponding to the recesses of the masks is deactivated via the first hard mask 4 formed of Mo and the DLC layer 3. Thus, a nonmagnetic region 8 is formed on the magnetic recording layer 2. The magnetism deactivation is performed using an electron cyclotron resonance (ECR) ion gun, for example, using a gaseous mixture of He and $N_2$ having a partial pressure ratio of 1:3 at a gas pressure of 0.04 Pa, microwave power of 1000 W, and a compression voltage of 5000 V for a processing time of 60 seconds.

Figure 3G:
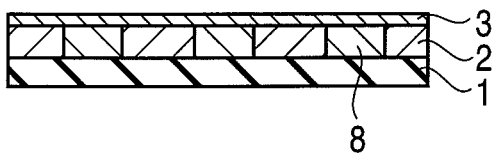
Figure 3H:
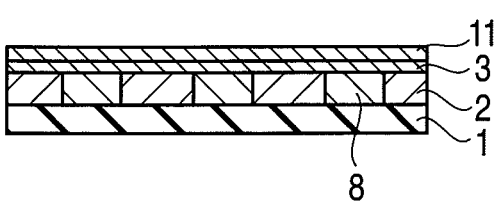

As shown in FIG. 3G, the remaining first hard mask (Mo) 4 is removed together with the layer above the first hard mask 4. The step is performed by immersing the medium into a hydrogen peroxide solution and retaining the medium in the solution for one minute. Thus, the first hard mask 4 is released from the PLC layer 3.

As shown in 3H, the protective layer 11 is formed by chemical vapor deposition (CVD), and a lubricant is applied, thereby a patterned medium was obtained.

In the manufacturing method according to the first embodiment, the first hard mask 4 functions as an implantation depth-adjusting layer which adjusts an implantation depth of an ion beam. The first hard mask 4 as the implantation depth-adjusting layer is formed in the stage of stacking each layer of FIG. 3A.

Difference from Manufacturing Method of a Comparative Example

The difference between the manufacturing method according to the embodiment and a manufacturing method according to a comparative example will be described with reference to FIGS. 4A, 4B, and 4C, FIGS. 5A, 5B, 5C, and 5D, and FIGS. 6A, 6B, 6C, and 6D.

Figure 4A:
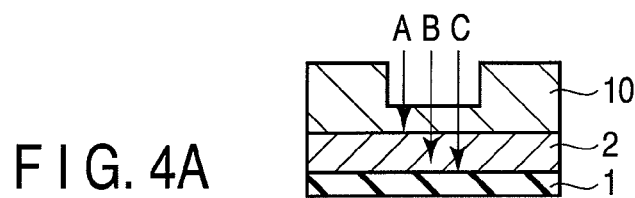
FIGS. 4A, 4B, and 4C are sectional views showing a manufacturing method according to a comparative example.
Figure 4B:
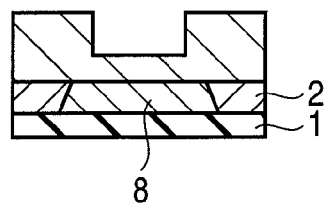
Figure 4C:
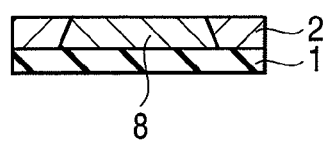
Figure 5A:
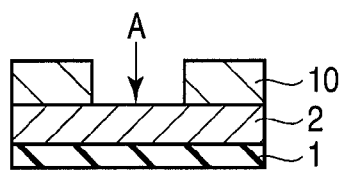
FIGS. 5A, 5B, 5C, and 5D are sectional views showing a manufacturing method according to a comparative example.
Figure 5B:
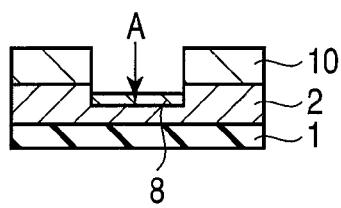
Figure 5C:
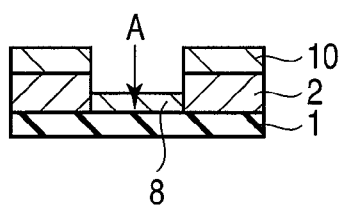
Figure 5D:
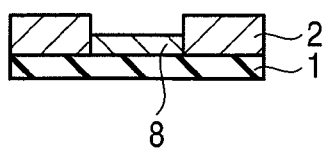

The manufacturing methods according to comparative examples are shown in FIGS. 4A, 4B, and 4C and FIGS. 5A, 5B, 5C, and 5D, and the manufacturing method according to the embodiment is shown in FIGS. 6A, 6B, 6C, and 6D. In the manufacturing method according to the comparative example, a magnetic recording layer 2 is deactivated via a mask 10 by a plurality of ion beams (A to C) having different energies as shown in FIGS. 4A, 4B, and 4C, for example. In the method, the ion beams having relatively high energies are irradiated, and the deactivation of the magnetic recording layer 2 is performed without etching the mask 10. A nonmagnetic region 8 formed by the deactivation is broadened in a lateral direction because of the use of the plurality of ion beams. Alternatively, deactivation of the magnetic recording layer 2 is performed without a mask as shown in FIGS. 5A, 5B, 5C, and 5D. In this case, an ion beam having a relatively low energy is used, and a part of the magnetic recording layer 2 is removed along with a progress of the deactivation, resulting in formation of a medium having irregularity on its surface.

In the manufacturing method according to the embodiment, as shown in FIGS. 6A, 6B, 6C, and 6D, the magnetic recording layer 2 is irradiated with an ion beam via the implantation depth-adjusting layer 9 (included in a mask 10 in the drawings), so that the deactivation of magnetism is performed while reducing a film thickness of the mask 10.

Therefore, it is possible to prevent or minimize lateral broadening of the nonmagnetic region 8 and generation of irregularity on a medium surface.

Figure 7A:
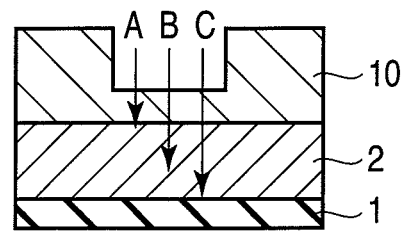
FIGS. 7A and 7B are a sectional view showing ion implantation and a diagram showing lateral broadening according to a comparative example.
Figure 7B:
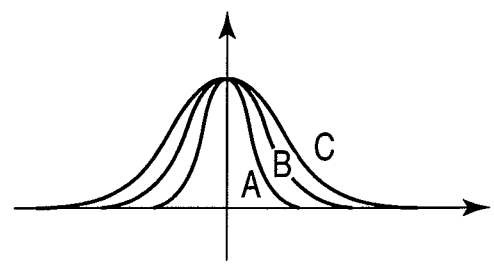
Figure 8A:
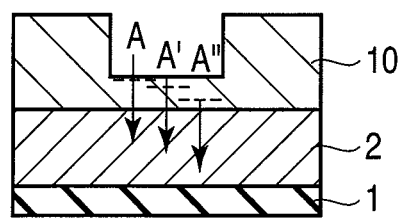
FIGS. 8A and 8B are a sectional view showing ion implantation according to the embodiment and a diagram showing lateral broadening.
Figure 8B:
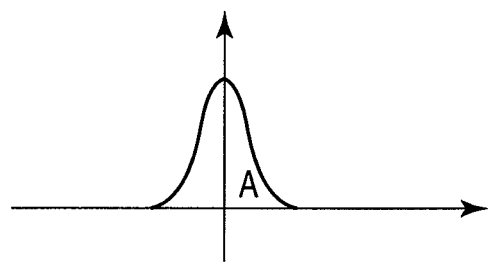
Figure 9:
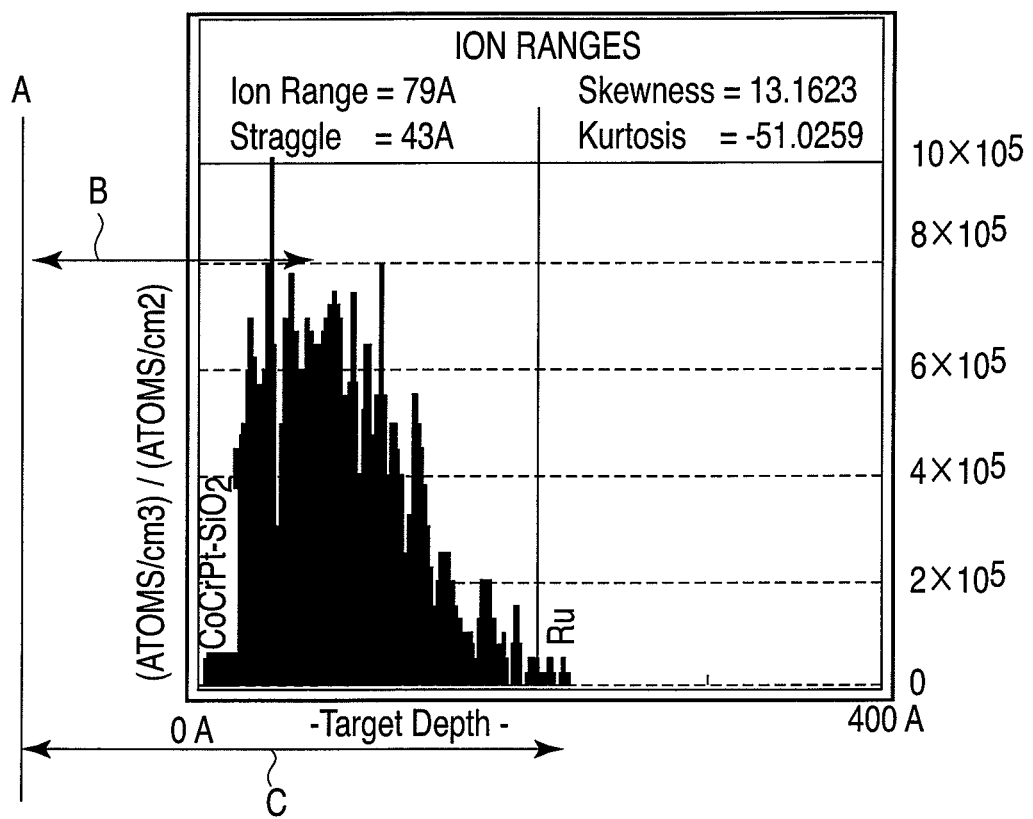
FIG. 9 is a diagram showing ion distribution with respect to a depth direction in ion beam.

A detailed description will be given with reference to FIGS. 7A and 7B, FIGS. 8A and 8B, and FIG. 9. FIGS. 7A and 7B are a sectional view showing ion implantation and a diagram showing lateral broadening according to a comparative example. FIGS. 8A and 8B are a sectional view showing ion implantation according to the embodiment and a diagram showing lateral broadening. FIG. 9 is a diagram showing ion distribution with respect to a depth direction in ion beam.

In the case of performing the ion beam irradiation for the purpose of the magnetism deactivation, the ion distribution in the depth direction as shown in FIG. 9 is generally caused. In FIG. 9, the horizontal axis indicates the depth, and the vertical axis indicates ion amounts at specific depths. As shown in FIG. 9, an amount of injected ion is not constant over the entire depth, and a peak of the ion amount is exhibited at a certain depth in the distribution. Therefore, in the case where the magnetic recording layer is irradiated with a single ion beam, a portion of sufficient deactivation and a portion of insufficient deactivation are generated in accordance with the ion distribution in the depth direction.

In the manufacturing method according to the comparative example, a plurality of types of ion beams varied in valance or a plurality of ion beams having different energies are used as shown in FIG. 7A for the purpose of avoiding the nonuniform deactivation. In other words, it is intended to attain uniform magnetism deactivation by compensating for ion amounts by means of the plurality of ion beams having different peaks. However, lateral broadening of the plurality of ion beams are different from each other as shown in FIG. 7B, and, as a result, the nonmagnetic region 8 which is broader than the shape of the recesses in the mask 10 is undesirably formed to deteriorate a fringe property.

In contrast, in the manufacturing method according to the embodiment, the magnetic recording layer 2 is deactivated via the implantation depth-adjusting layer 9 which is reduced along with the deactivation. With such constitution, it is possible to prevent formation of the irregularity on the surface of the magnetic recording layer 2. Further, it is possible to attain the uniform magnetism deactivation in the depth direction even in the case of using a single ion beam. The uniform deactivation is attained since the ion distribution by the ion beam shifts downward along with the reduction in film thickness of the implantation depth-adjusting layer 9 to allow a peak of the ion beam to pass the entire part of the magnetic recording layer 2 in the depth direction. Also, since the single ion beam is used, it is possible to suppress the implantation energy, thereby enabling to deactivate magnetism while suppressing the lateral broadening (FIG. 8A).

Ion Beam Implantation Depth

In the embodiment, the term "ion beam implantation depth" is defined as follows with reference to FIG. 9. More specifically, "ion beam implantation depth" is a distance from a surface (A) of the implantation depth-adjusting layer 9 at the start of deactivation to an end (C) of the ion distribution at a certain time point. Also, a distance from the surface (A) of the implantation depth-adjusting layer 9 at the start of deactivation to a peak (B) of an ion amount at a certain time point is defined as "ion implantation peak". It is possible to detect these distances by simulation such as TRIM. Also, it is possible to detect an actual degree of ion implantation by section TEM-EELS, TEM-EDX mapping, or the like. The ion beam is attenuated basically when passing through a heavy element or high density film and is hardly changed when passing through a light element or low density film. Therefore, in the deactivation of the magnetic recording layer 9, it is important to investigate "ion beam implantation depth" or "ion implantation peak".

In the embodiment, the ion beam implantation depth may preferably be positioned below the magnetic recording layer 2 at completion of the deactivation. The magnetic recording layer 2 is sufficiently deactivated when the ion beam reaches the entire magnetic recording layer 2 at the completion of deactivation. Also, the ion beam implantation depth at the start of deactivation may preferably be positioned within the magnetic recording layer 2. In the case where the peak of the ion beam is below the magnetic recording layer 2 at the start of irradiation, it is difficult to expect sufficient deactivation at a surface side of the magnetic recording layer 2 in some cases, but it is possible to perform sufficient magnetism deactivation when the ion beam implantation depth at the start of deactivation is positioned within the magnetic recording layer 2. The ion beam implantation depth at the start of deactivation may more preferably be positioned above the magnetic recording layer 2. With such constitution, since it is ensured that the peak of ion beam passes through a shallow region of the magnetic recording layer 2, it is possible to perform sufficient deactivation.

Second Embodiment

A method of manufacturing a magnetic recording medium according to the second embodiment will be described with reference to FIGS. 10A, 10B, 10C, 10D, 10E, 10F, 10G, 10H, 10I, and 10J.

Figure 10A:
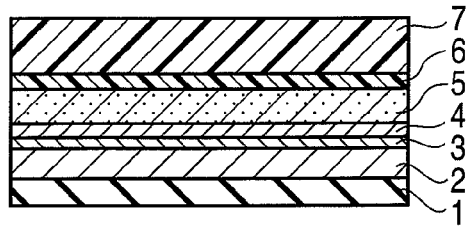
FIGS. 10A, 10B, 10C, 10D, 10E, 10F, 10G, 10H, 10I, and 10J are sectional views showing a method of manufacturing a magnetic recording medium according to a second embodiment.

As shown in FIG. 10A, a soft magnetic layer (CoZrNb) (not shown) having a thickness of 40 nm, an orientation controlling underlayer (Ru) (not shown) having a thickness of 20 nm, a magnetic recording layer 2 ($CoCrPt—SiO_2$) having a thickness of 20 nm, a DLC layer 3 having a thickness of 2 nm, a first hard mask (Mo) 4 having a thickness of 3 nm, a second hard mask (C) 5 having a thickness of 20 nm, and a third hard mask (Si) 6 having a thickness of 3 nm are formed on a glass substrate 1. A resist 7 is spin-coated on the third hard mask 6 in such a manner that a thickness thereof becomes 80 nm. As the resist 7, for example, an ordinary photoresist is used. Meanwhile, a stamper, on which predetermined patterns of protrusions and recesses corresponding to a pattern shown in FIG. 1 or 2 are formed, is prepared. The stamper is prepared by electron beam lithography, nickel electroforming, and injection molding. The stamper is disposed in such a manner that a protrusion-recess surface thereof is opposed to the resist 7.

Figure 10F:
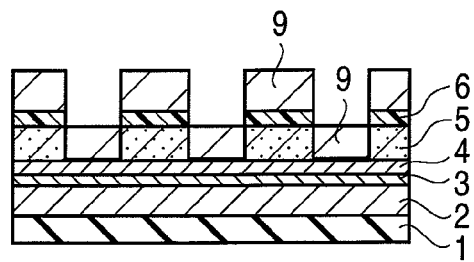
Figure 10B:
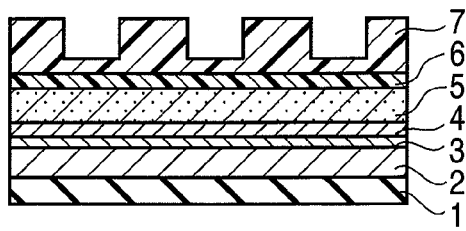

As shown in FIG. 10B, the stamper is imprinted on the resist 7 to print the patterns of protrusions and recesses of the stamper on the resist 7. After that, the stamper is removed. Shown in FIG. 10B is a state in which the stamper is removed after the imprint. A resist residue remains at the bottom of the recesses of the patterns of protrusions and recesses printed on the resist 7.

Figure 10G:
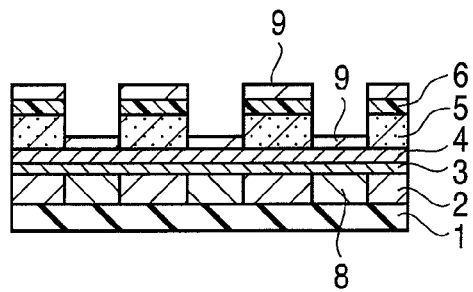
Figure 10C:
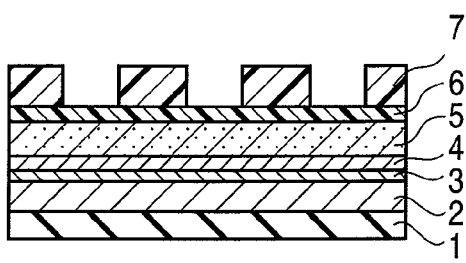

As shown in FIG. 10C, the resist residue in the recesses is removed by dry etching to expose a surface of the third hard mask 6. The step is performed using an ICP-RIE system, for example, using $CF_4$ as a process gas at a chamber pressure of 0.1 Pa and coil RF power and platen RF power of 100 W and 50 W, respectively, for an etching time of 60 seconds.

Figure 10H:
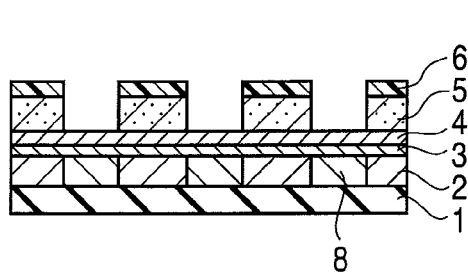
Figure 10D:
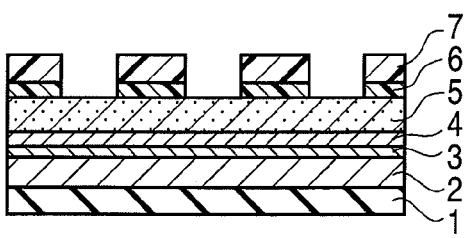

As shown in FIG. 10D, the pattern is printed on the third hard mask 6 by ion beam etching using the patterned resist 7 as a mask to expose the second hard mask 5 at the recesses. The step is performed using an ICP-RIE system, for example, using $CF_4$ as a process gas at a chamber pressure of 0.1 Pa and coil RF power and platen RF power of 100 W and 50 W, respectively, for an etching time of 20 seconds.

Figure 10I:
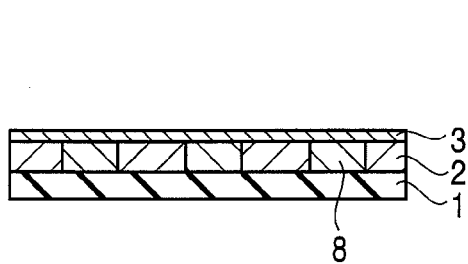
Figure 10E:
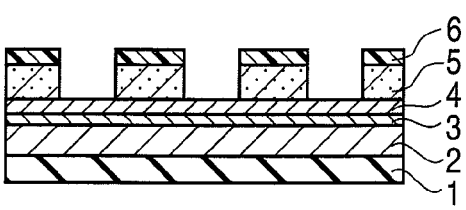
Figure 10J:
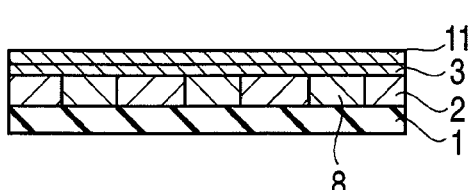

As shown in FIG. 10E, the pattern is printed by etching the second hard mask 5 formed of C by using the patterned third hard mask 6 as a mask to expose a surface of the first hard mask 4 at the recesses. The step is performed using an ICP-RIE system, for example, using $O_2$ as a process gas at a chamber pressure of 0.1 Pa and coil RF power and platen RF power of 100 W and 50 W, respectively, for an etching time of 20 seconds.

As shown in FIG. 10F, an implantation depth-adjusting layer 9 is formed on the medium in which the patterns of protrusions and recesses are formed above the second hard mask 5. For example, a film of Cr having a thickness of 30 nm is formed.

As shown in FIG. 10G, magnetism of regions of the magnetic recording layer 2 corresponding to the recesses of the masks is deactivated via the implantation depth-adjusting layer 9 formed of Cr, the first hard mask 4 formed of Mo, and the DLC layer 3. Thus, a nonmagnetic region 8 is formed on the magnetic recording layer 2. The magnetism deactivation is performed using an ECR ion gun, for example, using a gaseous mixture of He and $N_2$ having a partial pressure ratio of 1:1 at a gas pressure of 0.04 Pa, microwave power of 1000 W, and a compression voltage of 5000 V, for a processing time of 100 seconds.

As shown in FIG. 10H, the remaining implantation depth-adjusting layer 9 is removed. The step is performed using an RIE system, for example, using $Cl_2$ as a process gas at a chamber pressure of 1 Pa and power of 400 W, for an etching time of 20 seconds.

As shown in FIG. 10I, the remaining first hard mask (Mo) 4 is removed together with the layer above the first hard mask 4. The step is performed by immersing the medium into a hydrogen peroxide solution and retaining the medium in the solution for one minute. Thus, the first hard mask 4 is released from the DLC layer 3. Further, the surface is cleaned using $H_2$ plasma.

As shown in 10J, a protective layer 11 is formed by CVD, and a lubricant is applied, thereby a patterned medium was obtained.

In the manufacturing method according to the second embodiment, the implantation depth-adjusting layer 9 is provided independently of the first hard mask 4. Therefore, it is possible to form the thin first hard mask 4. The implantation depth-adjusting layer 9 is formed after forming the patterns of protrusions and recesses on the mask as shown in FIG. 10F.

Third Embodiment

A method of manufacturing a magnetic recording medium according to a third embodiment will be described with reference to FIGS. 11A, 11B, 11C, 11D, 11E, 11F, 11G, 11H, 11I, 11J, and 11K. Since it is possible to perform the steps of FIGS. 11A, 11B, 11C, 11D, and 11E in the same manner as in the steps of FIGS. 10A, 10B, 10C, 10D, and 10E according to the second embodiment, the description is not repeated. In the third embodiment, for example, the DLC layer 3 having a thickness of 3 nm is formed.

Figure 11A:
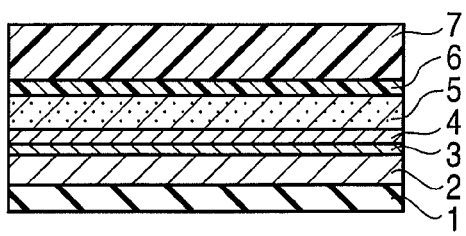
FIGS. 11A, 11B, 11C, 11D, 11E, 11F, 11G, 11H, 11I, 11J, and 11K are sectional views showing a method of manufacturing a magnetic recording medium according to a third embodiment.
Figure 11B:
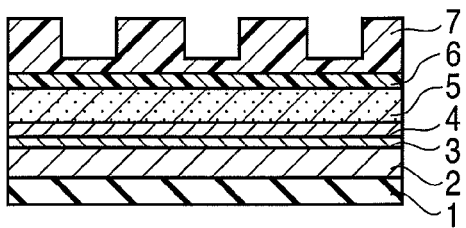
Figure 11C:
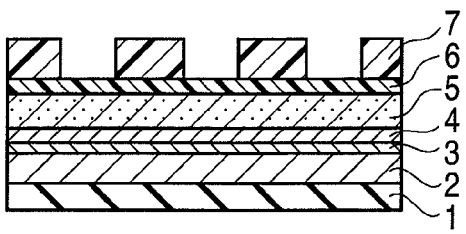
Figure 11D:
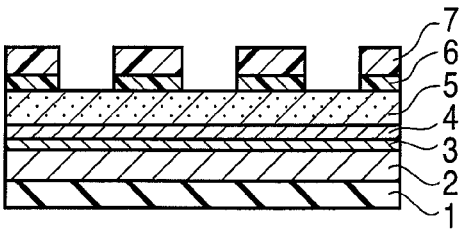
Figure 11E:
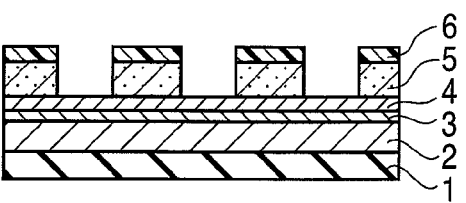
Figure 11F:
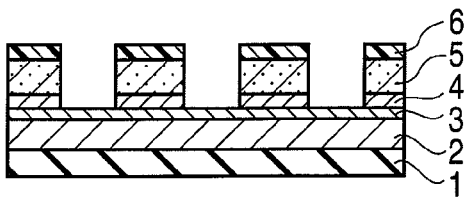

As shown in FIG. 11F, a pattern is printed by etching a first hard mask 4 formed of Mo by using a patterned second hard mask 5 as a mask to expose a surface of a DLC layer 3 at the recesses. The processing is performed using an ion milling system, for example, using Ar as a process gas at a chamber pressure of 0.05 Pa and an acceleration voltage of 400 V, for a processing time of 10 seconds.

Figure 11G:
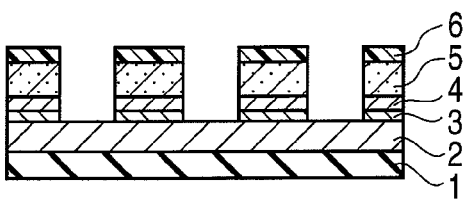

As shown in FIG. 11G, the pattern is printed by etching the DLC layer 3 by using the patterned first hard mask 4 as a mask to expose a surface of the magnetic recording layer 2 at the recesses. The processing is performed using an ICP-RIE system, for example, using $O_2$ as a process gas at a chamber pressure of 0.1 Pa and coil RF power and platen RF power of 100 W and 50 W, respectively, for an etching time of 20 seconds.

Figure 11H:
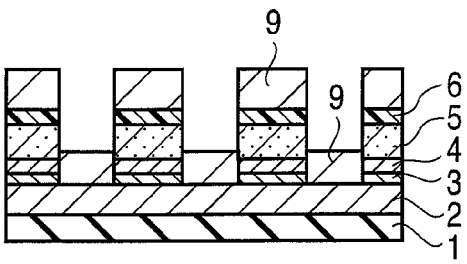

As shown in FIG. 11H, an implantation depth-adjusting layer 9 is formed on the medium in which the patterns of protrusions and recesses are formed above the magnetic recording layer 2. For example, a film of W having a thickness of 30 nm is formed.

Figure 11I:
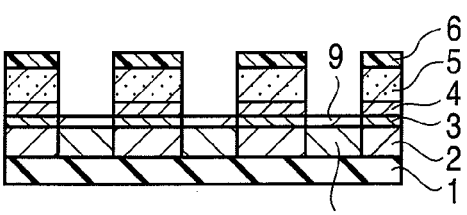

As shown in FIG. 11I, magnetism of regions of the magnetic recording layer 2 corresponding to the recesses of the masks is deactivated via the implantation depth-adjusting layer 9 formed of W. The step is performed using an ECR ion gun, for example, using gaseous $N_2$ at a gas pressure of 0.04 Pa, microwave power of 1000 W, and a compression voltage of 5000 V, for a processing time of 50 seconds. By this processing, the film thickness of the implantation depth-adjusting layer 9 is reduced from 30 to 2 nm, for example.

Figure 11J:
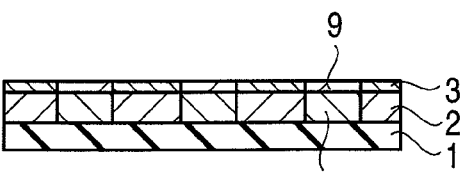
Figure 11K:
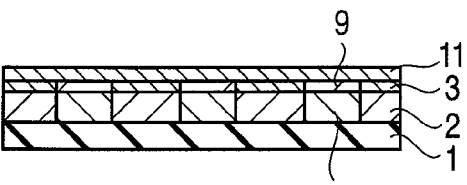

As shown in FIG. 11J, the remaining first hard mask (Mo) 4 is removed together with the layer above the first hard mask 4. The step is performed by immersing the medium into a hydrogen peroxide solution and retaining the medium in the solution for one minute. Thus, the first hard mask 4 is released from the PLC layer 3, and the implantation depth-adjusting layer 9 is left on the nonmagnetic region of the magnetic recording layer 2 with the PLC layer 3 being left on regions in which magnetism is maintained. The film thickness of the remaining PLC layer 3 is 3 nm, for example, and the film thickness of the implantation depth-adjusting layer 9 is 2 nm, thereby a difference between protrusions and recesses is 1 nm.

As shown in 11K, a protective layer 11 is formed by CVD, and a lubricant is applied, thereby a patterned medium was obtained.

In the manufacturing method according to the third embodiment, the implantation depth-adjusting layer 9 is provided independently of the first hard mask 4. Therefore, it is possible to form the thin first hard mask 4. The implantation depth-adjusting layer 9 is formed after the formation of the patterns of protrusions and recesses on the mask as shown in FIG. 11H.

Fourth Embodiment

A method of manufacturing a magnetic recording medium according to a forth embodiment will be described with reference to FIGS. 12A, 12B, 12C, 12D, 12E, 12F, 12G, 12H, 12I, 12J, and 12K. Since it is possible to perform the steps of FIGS. 12A, 12B, 12C, 12D, and 12E in the same manner as in the steps of FIGS. 10A, 10B, 10C, 10D, and 10E, the description is not repeated. In the fourth embodiment, for example, the DLC layer 3 having a thickness of 3 nm is formed.

Figure 12A:
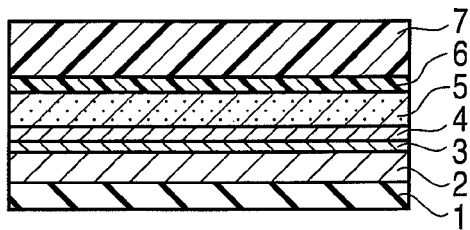
FIGS. 12A, 12B, 12C, 12D, 12E, 12F, 12G, 12H, 12I, 12J, and 12K are sectional views showing a method of manufacturing a magnetic recording medium according to a forth embodiment.
Figure 12B:
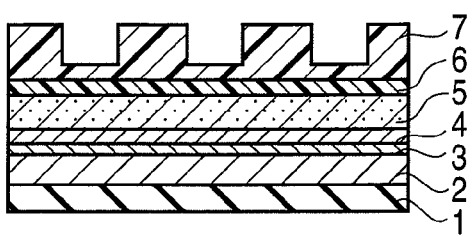
Figure 12C:
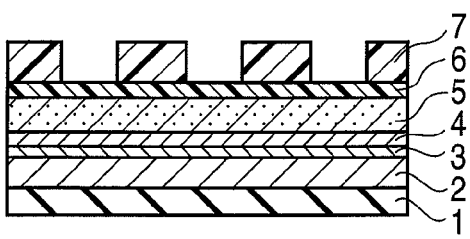
Figure 12D:
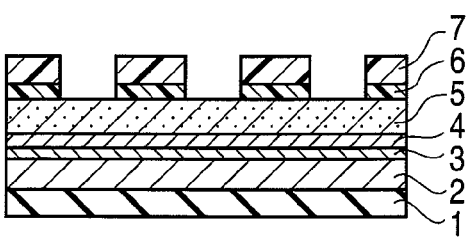
Figure 12E:
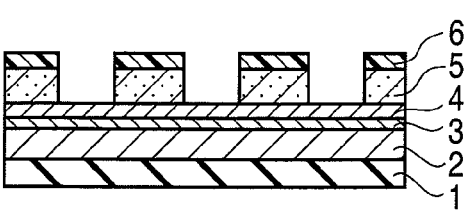
Figure 12F:
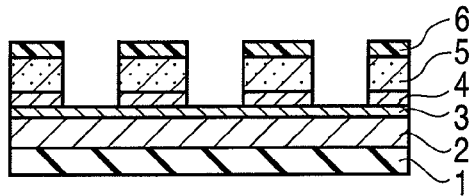

As shown in FIG. 12F, a pattern is printed by etching a first hard mask 4 formed of Mo by using a patterned second hard mask 5 as a mask to expose a surface of a DLC layer 3 at the recesses. The processing is performed using an ion milling system, for example, using Ar as a process gas at a chamber pressure of 0.05 Pa and an acceleration voltage of 400 V, for a processing time of 10 seconds.

Figure 12G:
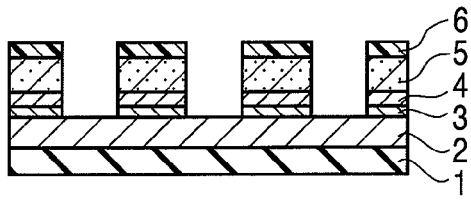

As shown in FIG. 12G, the pattern is printed by etching the DLC layer 3 by using the patterned first hard mask 4 as a mask to expose a surface of the magnetic recording layer 2 at the recesses. The processing is performed using an ICP-RIE system, for example, using $O_2$ as a process gas at a chamber pressure of 0.1 Pa and coil RF power and platen RF power of 100 W and 50 W, respectively, for an etching time of 20 seconds.

Figure 12H:
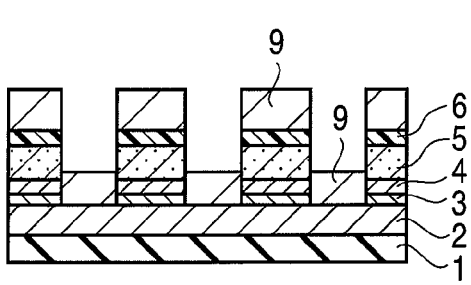

As shown in FIG. 12H, an implantation depth-adjusting layer 9 is formed on the medium in which the patterns of protrusions and recesses are formed above the magnetic recording layer 2. For example, a film of W having a thickness of 25 nm is formed.

Figure 12I:
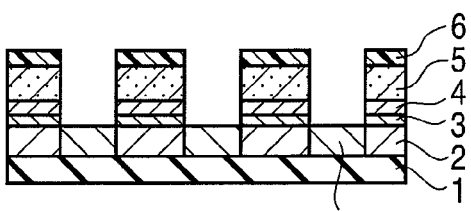

As shown in FIG. 12I, magnetism of regions of the magnetic recording layer 2 corresponding to the recesses of the masks is deactivated via the implantation depth-adjusting layer 9 formed of W. The step is performed using an ECR ion gun, for example, using gaseous $N_2$ at a gas pressure of 0.04 Pa, microwave power of 1000 W, and a compression voltage of 5000 V for a processing time of 50 seconds. By this processing, the entire implantation depth-adjusting layer 9 is etched, and 3 nm, for example, of the nonmagnetic region 8 is etched.

Figure 12J:
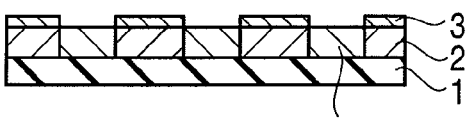
Figure 12K:
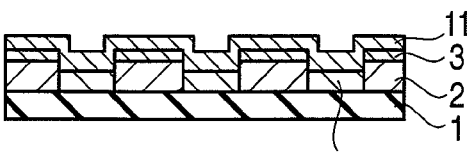

As shown in FIG. 12J, the remaining first hard mask (Mo) 4 is removed together with the layer above the first hard mask 4. The step is performed by immersing the medium into a hydrogen peroxide solution and retaining the medium in the solution for one minute. Thus, the first hard mask 4 is released from the DLC layer 3, and the PLC layer 3 remains on regions of the magnetic recording layer 2 in which magnetism is maintained. The film thickness of the remaining DIG layer 3 is 3 nm, for example, and 3 nm of a nonmagnetic region 8 has been etched, thereby a difference between protrusions and recesses is 6 nm.

As shown in 12K, a protective layer 11 is formed by CVD, and a lubricant is applied, thereby a patterned medium was obtained.

In the manufacturing method according to the fourth embodiment, the implantation depth-adjusting layer 9 is provided independently of the first hard mask 4. Therefore, is possible to form the thin first hard mask 4. The implantation depth-adjusting layer 9 is formed after the formation of the patterns of protrusions and recesses on the mask as shown in FIG. 12H. Also, the entire implantation depth-adjusting layer 9 is removed as shown in FIG. 12I by forming the thin implantation depth-adjusting layer 9 as compared to the third embodiment.

Incidentally, in the above processes, the thickness of various types of films and the depth of the recesses can easily be measured using, for example, AFM (atomic force microscope), cross-sectional TEM (transmission electron microscope) or the like. Also, the type of metal mask and its composition ratio can easily be determined by EDX (energy dispersive X-ray spectroscopy) analysis. It is also possible to investigate the type of etching gas used in the ion beam etching and its effect by subjecting the finished medium to XPS (X-ray photoelectron spectroscopy) analysis to analyze the remaining gas within the medium. Edge roughness can be measured by an image analysis which uses AFM or planar scanning electron microscopy (SEM).

[Details of Materials]

Hereinafter, materials which are usable in the method of manufacturing patterned medium according to the embodiment will be described.

Implantation Depth-Adjusting Layer

The implantation depth-adjusting layer 9 is provided for the purpose of adjusting an ion implantation depth by ion beam irradiation. The ion beam implantation depth is increased as a film thickness of the implantation depth-adjusting layer 9 is reduced along with a progress of deactivation.

For the implantation depth-adjusting layer 9, resist materials, various inorganic substances, metals, and compounds thereof are usable. In the case of using the resist material, an ordinary photocurable resist, a heat-curable resist, a SOG (spin-on-glass), or the like may be used. A patterned resist may be used as the implantation depth-adjusting layer. Also, a film of the resist material may be formed by vapor deposition or the like after the pattern formation of each mask. In the case of using the nonmetallic inorganic substance, C, $C_xN_y$ (y≦x), Si, $SiO_2$, $Si_xN_y$ (y≦4x/3), $Si_xC_y$ (y≦25x), or the like may be used. In the case of using the metal, a noble metal such as Ag, Au, Cu, Pd, Pt, and Ru and a metal from which a compound is easily formed, such as Al, Cr, Hf, Mo, Nb, Ta, Ti, V, W, and Zr may be used. The materials which easily give a compound during a processing generally have a low etching rate. The implantation depth-adjusting layer 9 having the low etching rate enables implantation of a sufficient ion amount and, therefore, is preferred. Also, since the noble metal hardly forms a reaction product with an injected ion species, the noble metal has the advantage that the ion is not entrapped in the implantation depth-adjusting layer 9 and easily injected.

The first hard mask 4 may be used as the implantation depth-adjusting layer 9. In this case, the implantation depth-adjusting layer 9 is formed as the first hard mask 4 in film formation of each layer (in the step of FIG. 3A, for example).

The implantation depth-adjusting layer 9 may be used as a release layer. For example, a metal such as Mo and Cr which is easily dissolved by acid is usable for the release after being used for the adjustment of implantation depth in the deactivation step. Also, it is possible to remove Ti and Ta using hydrofluoric acid. In the case of using the resist material for the implantation depth-adjusting layer 9, it is possible to remove the implantation depth-adjusting layer 9 using a resist release liquid. Also, a plurality of types of implantation depth-adjusting layers 9 may be layered to form a film. For Example, it is possible to realize sufficient ion implantation and release by weak acid by providing the implantation depth-adjusting layer such as Ta having the low etching rate at a medium surface side and providing the implantation depth-adjusting layer such as Mo which is easily released at a substrate side.

An initial film thickness of the implantation depth-adjusting layer 9 may be determined depending on an ion shielding property of the layer. For example, in the case of using a material having high ion shielding property, since the ion implantation depth is increased along with a reduction in the thickness of the implantation depth-adjusting layer 9, the implantation depth-adjusting layer 9 may be thin. In contrast, in the case of using a material having low ion shielding property, the ion implantation depth from the surface of the implantation depth-adjusting layer 9 can be reduced along with etching of the implantation depth-adjusting layer. In such case, it is necessary to form a thicker implantation depth-adjusting layer 9. There is a risk of insufficiency of the deactivation in the depth direction of the magnetic recording layer 2 when the initial film thickness of the implantation depth-adjusting layer 9 and the film thickness to be etched of the implantation depth-adjusting layer 9 are too thin in each of the cases of the high ion shielding property and the low ion shielding property. Therefore, it is necessary to appropriately select the initial film thickness of the implantation depth-adjusting layer 9 and the film thickness to be etched, depending on the ion implantation depth. From the viewpoint of maintaining robustness of the processing, the film thickness of the implantation depth-adjusting layer 9 may be thicker than an actually required thickness. In the case of forming the film functioning as the first hard mask 4 and the implantation depth-adjusting layer 9, the film thickness may preferably be 10 to 40 nm, for example, particularly preferably 15 to 30 nm. The same applies to the case of forming the implantation depth-adjusting layer 9 after the protrusion-recess mask pattern formation. It is possible to adjust whether to remove the entire implantation depth-adjusting layer 9 or to partially leave the implantation depth-adjusting layer 9 by the magnetism deactivation by adjusting the thickness of the film to be formed.

Resist

As the resist 7, for example, a UV curing resist or a general novolak-type photoresist may be used. When the UV curing resist is used, the stamper is preferably made of a transparent material such as quartz or resin. The UV curing resist is cured by applying ultraviolet ray. A high-pressure mercury lamp, for example, can be used as a light source of the ultraviolet ray. When the general novolak-type photoresist is used, the stamper may be made of a material such as Ni, quartz, Si and SiC. The resist can be cured by applying heat or pressure.

Hard Mask

For the first to third hard masks, it is preferable to use a hard mask which is different in composition from the implantation depth-adjusting layer 9. Since differences in etching rate and shielding property among the layers are caused by the different compositions, spreading of the injected ion in a thickness direction and in-plane direction is prevented. In the case of using the metal such as Cr and Mo as the implantation depth-adjusting layer 9, the material containing the resist or C as a main component is preferred since the material is capable of enhancing the selectivity. In contrast, in the case of using C for the implantation depth-adjusting layer 9, Si, Ta, Ti, and the like may be used for the hard masks. However, the first hard mask 4 may be provided as the implantation depth-adjusting layer 9.

A material which is easily released may be used for the first hard mask 4. For example, a material having higher reactivity to the release liquid than the main component of the magnetic recording layer may be used. More specifically, Mo, Cr, Ta, V, Nb, Ta, Zr, Al, or the like may be used. In the case where the first hard mask 4 is provided as the implantation depth-adjusting layer 9, a film thickness of the hard mask 4 may preferably be 10 to 40 nm, particularly preferably 20 to 30 nm. Also, in the case where the first hard mask 4 is provided as the release layer, a film thickness of the first hard mask 4 may preferably be 1 to 5 nm, particularly preferably 3 nm.

For the second hard mask 5, a material containing carbon as a main component, CN, BC, or the like may be used. It is particularly preferable that carbon is contained in an amount of 70% or more. A film thickness of the second hard mask 5 may preferably be 15 to 100 nm, particularly preferably 20 to 50 nm.

For the third hard mask 6, Si, Ti, Ta, W, or the like may be used. It is particularly preferable to use Si. A film thickness of the third hard mask 6 may preferably be 2 to 5 nm, particularly preferably 3 nm.

DLC Layer

As a layer for preventing the magnetic recording layer 2 from oxidizing, the DLC layer 3 may be provided between the first hard mask 4 and the magnetic recording layer 2. The DLC layer 3 contains carbon as a main component. A thickness of the DLC layer 3 may be 1 to 20 nm.

Substrate

As the substrate 1, for example, a glass substrate, an Al-based alloy substrate, a ceramic substrate, a carbon substrate or an Si single crystal substrate having an oxide surface may be used. As the glass substrate, an amorphous glass and a crystallized glass are used. Examples of the amorphous glass may include a general-purpose soda lime glass and an alumina-silicate glass. As the crystallized glass, a lithium-based crystallized glass may be exemplified. Examples of the ceramic substrate may include a sintered material containing, as a major component, a general-purpose aluminum oxide, an aluminum nitride, silicon nitride or the like, and fiber-reinforced materials thereof. As the substrate 1, it is also possible to use the above-described metal substrates or nonmetal substrates with a NiP layer formed thereon by plating or sputtering. Additionally, the methods of forming a thin film on the substrate are not limited to sputtering, but may include vacuum evaporation or electrolytic plating which can obtain the same effect.

Soft Magnetic Underlayer

The soft magnetic underlayer (SUL) serves a part such a function of a magnetic head as to pass a recording magnetic field from a single-pole for magnetizing a perpendicular magnetic recording layer in a horizontal direction and to circulate the magnetic field to a return yoke, and applies a sharp and sufficient perpendicular magnetic field to the recording layer, thereby improving read/write efficiency. For the soft magnetic underlayer, a material containing Fe, Ni or Co may be used. Examples of such a material may include FeCo-based alloys such as FeCo and FeCoV, FeNi-based alloys such as FeNi, FeNiMo, FeNiCr and FeNiSi, FeAl-based alloys and FeSi-based alloys such as FeAl, FeAlSi, FeAlSiCr, FeAl-SiTiRu and FeAlO, FeTa-based alloys such as FeTa, FeTaC and FeTaN and FeZr-based alloys such as FeZrN. Materials having a microcrystalline structure such as FeAlO, FeMgO, FeTaN and FeZrN containing Fe in an amount of 60 at % or more or a granular structure in which fine crystal grains are dispersed in a matrix may also be used. As other materials to be used for the soft magnetic underlayer, Co alloys containing Co and at least one of Zr, Hf, Nb, Ta, Ti and Y may also be used. Such a Co alloy preferably contains 80 at % or more of Co. the case of such a Co alloy, an amorphous layer is easily formed when it is deposited by sputtering. Because the amorphous soft magnetic material is not provided with crystalline anisotropy, crystal defects and grain boundaries, it exhibits excellent soft magnetism and is capable of reducing medium noise, Preferable examples of the amorphous soft magnetic material may include CoZr-, CoZrNb- and CoZrTa-based alloys.

An underlayer may further be formed beneath the soft magnetic underlayer to improve the crystallinity of the soft magnetic underlayer or to improve the adhesion of the soft magnetic underlayer to the substrate. As the material of such an underlayer, Ti, Ta, W, Cr, Pt, alloys containing these metals or oxides or nitrides of these metals may be used. An intermediate layer made of a nonmagnetic material may be formed between the soft magnetic underlayer and the recording layer. The intermediate layer has two functions including the function to cut the exchange coupling interaction between the soft magnetic underlayer and the recording layer and the function to control the crystallinity of the recording layer. As the material for the intermediate layer Ru, Pt, Pd, W, Ti, Ta, Cr, Si, alloys containing these metals or oxides or nitrides of these metals may be used.

In order to prevent spike noise, the soft magnetic underlayer may be divided into plural layers and Ru layers with a thickness of 0.5 to 1.5 nm are interposed therebetween to attain anti-ferromagnetic coupling. Also, a soft magnetic layer may be exchange-coupled with a pinning layer of a hard magnetic film such as CoCrPt, SmCo or FePt having longitudinal anisotropy or an anti-ferromagnetic film such as IrMn and PtMn. A magnetic film (such as Co) and a nonmagnetic film (such as Pt) may be provided under and on the Ru layer to control exchange coupling force.

Magnetic Recording Layer

For the perpendicular magnetic recording layer, a material containing Co as a main component, at least Pt and further an oxide is preferably used. The perpendicular magnetic recording layer may contain Cr if needed. As the oxide, silicon oxide or titanium oxide is particularly preferable. The perpendicular magnetic recording layer preferably has a structure in which magnetic grains, i.e., crystal grains having magnetism, are dispersed in the layer. The magnetic grains preferably have a columnar structure which penetrates the perpendicular magnetic recording layer in the thickness direction. The formation of such a structure improves the orientation and crystallinity of the magnetic grains of the perpendicular magnetic recording layer, with the result that a signal-to-noise ratio (SN ratio) suitable to high-density recording can be provided. The amount of the oxide to be contained is important to provide such a structure.

The content of the oxide in the perpendicular magnetic recording layer is preferably 3 mol % or more and 12 mol % or less and more preferably 5 mol % or more and 10 mol % or less based on the total amount of Co, Cr and Pt. The reason why the content of the oxide in the perpendicular magnetic recording layer is preferably in the above range is that, when the perpendicular magnetic recording layer is formed, the oxide precipitates around the magnetic grains, and can separate fine magnetic grains. If the oxide content exceeds the above range, the oxide remains in the magnetic grains and damages the orientation and crystallinity of the magnetic grains. Moreover, the oxide precipitates on the upper and lower parts of the magnetic grains, with an undesirable result that the columnar structure, in which the magnetic grains penetrate the perpendicular magnetic recording layer in the thickness direction, is not formed. The oxide content less than the above range is undesirable because the fine magnetic grains are insufficiently separated, resulting in increased noise when information is reproduced, and therefore, a signal-to-noise ratio (SN ratio) suitable to high-density recording is not provided.

The content of Cr in the perpendicular magnetic recording layer is preferably 0 at % or more and 16 at % or less and more preferably 10 at % or more and 14 at % or less. The reason why the content of the Cr is preferably in the above range is that the uniaxial crystal magnetic anisotropic constant Ku of the magnetic grains is not too much reduced and high magnetization is retained, with the result that read/write characteristics suitable to high-density recording and sufficient thermal fluctuation characteristics are provided. The Cr content exceeding the above range is undesirable because Ku of the magnetic grains is lowered, and therefore, the thermal fluctuation characteristics are degraded, and also, the crystallinity and orientation of the magnetic grains are impaired, resulting in deterioration in read/write characteristics.

The content of Pt in the perpendicular magnetic recording layer is preferably 10 at % or more and 25 at % or less. The reason why the content of Pt is preferably in the above range is that the Ku value required for the perpendicular magnetic layer is provided, and further, the crystallinity and orientation of the magnetic grains are improved, with the result that the thermal fluctuation characteristics and read/write characteristics suitable to high-density recording are provided. The Pt content exceeding the above range is undesirable because a layer having an fcc structure is formed in the magnetic grains and there is a risk that the crystallinity and orientation are impaired. The Pt content less than the above range is undesirable because a Ku value satisfactory for the thermal fluctuation characteristics suitable to high-density recording is not provided.

The perpendicular magnetic recording layer may contain one or more types of elements selected from B, Ta, Mo, Cu, Nd, W, Nb, Sm, Tb, Ru and Re besides Co, Cr, Pt and the oxides. When the above elements are contained, formation of fine magnetic grains is promoted or the crystallinity and orientation can be improved and read/write characteristics and thermal fluctuation characteristics suitable to high-density recording can be provided. The total content of the above elements is preferably 8 at % or less. The content exceeding 8 at % is undesirable because phases other than the hcp phase are formed in the magnetic grains and the crystallinity and orientation of the magnetic grains are disturbed, with the result that read/write characteristics and thermal fluctuation characteristics suitable to high-density recording are not provided.

As the perpendicular magnetic recording layer, a CoPt-based alloy, CoCr-based alloy, CoPtCr-based alloy, CoPtO, CoPtCrO, CoPtSi, CoPtCrSi, a multilayer structure of an alloy layer containing at least one type selected from the group consisting of Pt, Pd, Rh and Ru and a Co layer, and materials obtained by adding Cr, B or O to these layers, for example, CoCr/PtCr, CoB/PdB and CoO/RhO may be used.

The thickness of the perpendicular magnetic recording layer is preferably 5 to 60 nm and more preferably 10 to 40 nm. When the thickness is in this range, a magnetic recording apparatus suitable to higher recording density can be manufactured. If the thickness of the perpendicular magnetic recording layer is less than 5 nm, read outputs are too low and noise components tend to be higher. If the thickness of the perpendicular magnetic recording layer exceeds 40 nm, read outputs are too high and the waveform tends to be distorted. The coercivity of the perpendicular magnetic recording layer is preferably 237000 A/m (3000 Oe) or more. In the bit patterned medium, the coercivity after patterning is preferably 237000 A/m (3000 Oe) or more. If the coercivity is less than 237000 A/m (3000 Oe), thermal fluctuation resistance tends to be degraded. The perpendicular squareness of the perpendicular magnetic recording layer is preferably 0.8 or more. If the perpendicular squareness is less than 0.8, the thermal fluctuation resistance tends to be degraded.

Protective Layer

The protective layer 11 is provided for the purpose of preventing corrosion of the perpendicular magnetic recording layer and also preventing the surface of a medium from being damaged when the magnetic head is brought into contact with the medium. Examples of the material of the protective layer 11 include those containing C, $SiO_2$ or $ZrO_2$. It is preferable to set the thickness of the protective layer 11 from 1 to 10 nm.

Since such a thin protective layer 11 enables to reduce the spacing between the head and medium, it is suitable for high-density recording. Carbon may be classified into $sp^2$-bonded carbon (graphite) and $sp^3$-bonded carbon (diamond). Though $sp^3$-bonded carbon is superior in durability and corrosion resistance to graphite, it is inferior in surface smoothness to graphite because it is crystalline material. Usually, carbon is deposited sputtering using a graphite target. In this method, amorphous carbon in which $sp^2$-bonded carbon and $sp^3$-bonded carbon are mixed is formed. Carbon in which the ratio of $sp^3$-bonded carbon is larger is called diamond-like carbon (DLC). DLC is superior in durability and corrosion resistance and also in surface smoothness because it is amorphous and therefore utilized as the surface protective layer for magnetic recording media. The deposition of DLC by CVD (chemical vapor deposition) produces DLC through excitation and decomposition of raw gas plasma and chemical reactions, and therefore, DLC richer in $sp^3$-bonded carbon can be formed by adjusting the conditions.

[Details of Steps]

Hereinafter, steps included in the method of manufacturing patterned medium according to the embodiment will be described.

Mask Formation

The first hard mask 4, the second hard mask 5, and the third hard mask 6 are formed in this order on a surface layer of the magnetic recording layer of an ordinary magnetic recording medium. It is possible to form these hard masks by sputtering or CVD.

After that, the resist 7 is formed on the hard masks. A resist is uniformly applied to the surface of a medium by spin-coating, dipping method, ink-jet method, or the like. As the resist, a general photosensitive resin, a thermoplastic resin or a thermosetting resin may be used. The resin may desirably be one which can be etched by RIE using a gas containing oxygen or fluorine.

Imprint

After the formation of the resist 7, the stamper is imprinted to print the patterns of protrusions and recesses on the resist 7. As the stamper for imprinting, one which is made of a material such as quartz, resin, Si or Ni is used. When a stamper made of quartz or resin is used, it is preferable to use a photosensitive resin (photoresist) which is cured with ultraviolet rays. When the resist is made of a thermosetting resin or a thermoplastic resin, the stamper is preferably made of Si or Ni, in view of the heat or pressure applied thereto in imprinting.

The imprinting is performed, for example, by pressing the resist with a resin stamper on which patterns of recording tracks and servo information are formed with a pressure of 5 t for 60 seconds, and by irradiating the resist with ultraviolet ray for 10 seconds, to thereby transfer the patterns onto the resist. For the pressing, on the lower plate of a die set, laminated in order are: the stamper, the substrate, and the stamper. The resultant layers are sandwiched between the lower plate and the upper plate of the die set. The resist is applied on both sides of the substrate beforehand. The stamper and the substrate are disposed such that the surface of the stamper having the protrusions and recesses faces the resist-coated side of the substrate. The patterns of protrusions and recesses formed by the imprinting have a height of 30 to 50 nm, and resulting residues have a thickness of about 5 to 20 nm. If a fluorine-based releasing agent is applied to the stamper, the stamper can be released from the resist satisfactorily.

Removal of Residues

Removal of resist residues left after the imprinting is performed by RIE (reactive ion etching). As the plasma source, ICP (inductively coupled plasma) capable of producing high-density plasma under a low pressure is preferable, but an ECR (electron cyclotron resonance) plasma or general parallel-plate RIE system may be used. When a photosensitive resin is used as the resist 7, $O_2$ gas, $CF_4$ gas, or a mixture gas of $O_2$ and $CF_4$ is used. When an Si-based material (SOG (Spin-On-Glass), for example) is used as the resist 7, RIE which uses fluorine-containing gas such as $CF_4$ or $SF_6$ is used. The removal of residues is finished at the point where the third hard mask 6 under the resist is exposed.

Patterning of Third Hard Mask

After the imprint and the resist residue removal, patterning of the third hard mask 6 is performed using the resist 7 on which the pattern is formed as a mask. An RIE system may be used for the patterning of the third hard mask 6, or other ion beam etching system may be used for the patterning. The patterning of the third hard mask 6 is brought to an end when the surface of the second hard mask 5 is exposed.

Patterning of Second Hard Mask

After the patterning of the third hard mask 6, the second hard mask 5 is patterned. The patterning of the second hard mask 5 may be conducted by use of RIE which uses a reactive gas or use of ion beam etching which uses an inert gas. If the etching is conducted by use of a reactive gas, it is preferred to use, for example, $SF_6$, $CF_4$, $Cl_2$, HBr. Alternatively, it is also preferred to use a gas comprising at least one of these gases and an inert gas such as Ar as an assist. If the etching is conducted by use of an inert gas, it is preferred to use a gas such as He, Ne, Ar, Xe or Kr. It is also preferred to use the inert gas which is mixed with a reactive gas such as $N_2$ or $O_2$. The patterning of the second hard mask 5 is finished at the point where the surface of the first hard mask 4 is exposed.

Magnetism Deactivation of Magnetic Recording Layer

The magnetism deactivation by ion beam irradiation is employed for the patterning of the magnetic recording layer 2. A fringe property of the magnetic recording medium is improved by the magnetism deactivation. The magnetism deactivation means a step of weakening magnetism of regions exposed from the mask of the magnetic recording layer 2 as compared to magnetism of regions covered with the mask. "Weakening magnetism" means to decrease the saturation magnetization (Ms), for example, to change into a soft magnetic, paramagnetic or antiferromagnetic property. It is possible to observe the magnetism change by measuring a value of Hn, Hs, Hc, or the like using a vibrating sample magnetometer (VSM) or a Kerr (magnetooptic Kerr effect) measurement system.

It is possible to generate the ion beam using an ordinary ion injector, an ECR ion shower system, a scanning flux ion beam system, a gas cluster ion beam system, or the like. The ion injector is capable of irradiating a large area with an ion beam at a high throughput, and an ECR ion source is capable of shortening a takt time per medium at high current density.

An ion species to be used may preferably be a rare gas such as He, Ne, Ar, Kr, Xe, and the like, a reactive gas such as $N_2$, $O_2$, $H_2$, and the like, or a mixture thereof. With the use of the rare gas, it is possible to weaken vertical orientation of magnetism by forming the magnetic recording layer into amorphous. With the use of the reactive gas such as $N_2$, $O_2$, $H_2$, and the like, it is possible to reduce magnetism by reacting with the magnetic element of the recording layer or penetrating into a lattice. Also, when the reactive gas and the rare gas are mixed, it is possible to attain higher reactivity to shorten the takt time of deactivation.

An ion amount to be injected in the ion beam irradiation is in accordance with a gauss distribution having a width depending on energy of the ion to be injected and a material to which the ion is injected. An ion beam having relatively low energy is preferred for the implantation into the thin recording layer of about several tens of nanometers such as the patterned medium according to the embodiment. The energy of the ion beam may preferably be 100 keV or less, more preferably 50 keV or less.

Release of First Hard Mask

After the patterning of the magnetic recording layer, release of the first hard mask 4 is performed. The second hard mask 5, the third hard mask 6, and the like remaining on the first hard mask 4 are released together with the first hard mask 4. A method of the release may appropriately be selected depending on the material to be used for the first hard mask 4. For example, a wet processing, reactive ion etching, ion beam etching, or the like may be performed.

In the case of the wet processing, water, an acid, an alkali, or the like may be used as the release liquid. By providing a protective layer formed of DLC or the like between the first hard mask 4 as the release layer and the magnetic recording layer 2, it is possible to release the mask without damaging the magnetic recording layer. The release liquid is appropriately selected depending on the material of the first hard mask 4, and, for example, high temperature water, an acidic aqueous solution, or an alkaline aqueous solution may be used. More specifically, various acids and alkalis such as a hydrogen peroxide solution, hydrochloric acid, nitric acid, hydrofluoric acid, sulfamic acid, an ammonium solution, a sodium hydroxide solution, and the like are usable. After the release, the magnetic recording medium may preferably be washed with water or a solvent so that the release liquid does not remain thereon.

Deposition of Protective Layer and Post-Treatment

The protective layer 11 made of carbon may be deposited to obtain good coverage over the protrusions and recesses preferably by means of CVD, but it may be deposited also by means of sputtering or vacuum deposition. When CVD is used, a DLC film containing a large amount of $sp^3$ bonded carbon is formed. Thickness of 2 nm or less is not preferable because it results in an unsatisfactory coverage. On the other hand, thickness of 10 nm or more is not preferable because it increases magnetic spacing between the read/write head and the medium to lower SNR. A lubricant is applied to the surface of the protective layer 11. As the lubricant, for example, a perfluoropolyether, fluorinated alcohol, fluorinated carboxylic acid or the like may be used.

Film Formation for Implantation Depth-Adjusting Layer

A film for the implantation depth-adjusting layer 9 may be formed after formation of the pattern of protrusions and recesses of the mask. For example, in the manufacturing method according to the second embodiment, the film formation for the implantation depth-adjusting layer 9 is performed after the patterning of the second hard mask. Also, in the manufacturing methods according to the third and fourth embodiments, the film formation for the implantation depth-adjusting layer 9 is performed after the patterning of the DLC layer 3. A method of the film formation may appropriately be selected depending on the material to be used. For example, sputtering, vapor deposition, or the like may be performed The deactivation of the magnetic recording layer 2 is performed after the film formation for the implantation depth-adjusting layer 9.

First Hard Mask Patterning

The patterning of the first hard mask 4 may be performed after the patterning of the second hard mask 5. Particularly, the patterning is performed in the manufacturing methods according to the third and fourth embodiments. For the patterning of the first hard mask 4, the RIE using a reactive gas may be employed, or the ion beam etching using a rare gas may be employed. The patterning of the first hard mask 4 is brought to an end when the surface of the DLC layer 3 is exposed.

Patterning of DLC Layer

The patterning of the DLC layer 3 may be performed after the patterning of the first hard mask 4. Particularly, the patterning is performed in the manufacturing methods according to the third and fourth embodiments. For the patterning of the DLC layer 3, the RIE using a reactive gas may be employed, or the ion beam etching using a rare gas may be employed. The patterning of the DLC layer 3 is brought to an end when the surface of the magnetic recording layer 2 is exposed.

[Magnetic Recording Apparatus]

Now, the magnetic recording apparatus (HDD) according to the embodiment will be described below. FIG. 13 is a perspective view of a magnetic recording apparatus in which the magnetic recording medium manufactured according to the embodiment is installed.

As shown in FIG. 13, the magnetic recording apparatus 150 according to the embodiment is of a type using a rotary actuator. The patterned medium 100 is attached to the spindle 140, and is rotated in the direction of arrow A by a motor (not shown) that responds to control signals from a drive controller (not shown). The magnetic recording apparatus 150 may comprise a plurality of patterned media 100.

The head slider 130 configured to read from and write to the patterned medium 100 is attached to the tip of the film-like suspension 154. The head slider 130 has a magnetic head mounted near the tip thereof. When the patterned medium 100 rotates, the air bearing surface (ABS) of the head slider 130 is held at a predetermined height so as to fly over the surface of the patterned medium 100 under a balance of pressing force of the suspension 154 and the pressure produced on the air bearing surface (ABS) of head slider 130.

The suspension 154 is connected to one end of an actuator arm 160. A voice coil motor 156, a kind of linear motor, is provided on the other end of the actuator arm 160. The voice coil motor 156 is formed of a magnetic circuit including a driving coil (not shown) wound around a bobbin and a permanent magnet and a counter yoke arranged opposite to each other so as to sandwich the coil therebetween. The actuator arm 160 is held by ball bearings (not shown) provided at two vertical positions of the pivot 157. The actuator arm 160 can be rotatably slid by the voice coil motor 156. As a result, the magnetic head can be accessed any position on the patterned medium 100.

EXAMPLES

Example 1

A magnetic recording medium was manufactured by the method shown in FIGS. 3A, 3B, 3C, 3D, 3E, 3F, 3G, and 3H. Further, performance thereof was evaluated.

As shown in FIG. 3A, a soft magnetic layer (CoZrNb) (not shown) having at thickness of 40 nm, an orientation controlling underlayer (Ru) (not shown) having a thickness of 20 nm, a magnetic recording layer 2 (CoCrPt—$SiO_2$) having a thickness of 20 nm, a DLC protective layer 3 having a thickness of 2 nm, a first hard mask (Mo) 4 having a thickness of 30 nm, a second hard mask (C) 5 having a thickness of 30 nm, and a third hard mask (Si) 6 having a thickness of 3 nm were formed on a glass substrate 1. A resist 7 was spin-coated on the third hard mask 6 in such a manner that a thickness thereof becomes 80 nm. A stamper was disposed in such a manner that a protrusion-recess surface thereof is opposed to the resist 7.

As shown in FIG. 3E, the stamper was imprinted on the resist 7 to print the patterns of protrusions and recesses of the stamper on the resist 7. After that, the stamper was removed. A resist residue remained at the bottom of the recesses of the patterns printed on the resist 7.

As shown in FIG. 3C, the resist residue in the recesses was removed by dry etching to expose a surface of the third hard mask 6. The step was performed by means of an ICP-RIE system using $CE_4$ as a process gas at a chamber pressure of 0.1 Pa and coil RF power and platen RF power of 100 W and 50 W, respectively, for an etching time of 60 seconds.

As shown in FIG. 3D, the pattern was printed on the third hard mask 6 by ion beam etching using the patterned resist 7 as a mask to expose the second hard mask 5 at the recesses. The step was performed by means of an ICP-RIE system using $CF_4$ as a process gas at a chamber pressure of 0.1 Pa and coil RF power and platen RF power of 100 W and 50 W, respectively, for an etching time of 20 seconds.

As shown in FIG. 3E, the pattern was printed by etching the second hard mask 5 formed of C by using the patterned third hard mask 6 as a mask to expose a surface of the first hard mask 4 at the recesses. The step was performed by means of an ICP-RIE system using $O_2$ as a process gas at a chamber pressure of 0.1 Pa and coil RF power and platen RF power of 100 W and 50 W, respectively, for an etching time of 30 seconds.

As shown in FIG. 3F, regions of the magnetic recording layer 2 corresponding to the recesses of the mask was deactivated via the first hard mask 4 formed of Mo and the DLC layer 3. Thus, a nonmagnetic region 8 was formed on the magnetic recording layer 2. The magnetism deactivation is performed by means of an ECR ion gun using a gaseous mixture of He and $N_2$ having a partial pressure ratio of 1:3 at a gas pressure of 0.04 Pa, microwave power of 1000 W, and a compression voltage of 5000 V, for a processing time of 60 seconds.

As shown in FIG. 3G, the remaining first hard mask (Mo) 4 was removed together with the layer above the first hard mask 4. The step was performed by immersing the medium into a hydrogen peroxide solution and retaining the medium in the solution for one minute. Thus, the first hard mask 4 was released from the DLC layer 3.

As shown in 3H, a protective layer 11 was formed by CVD, and a lubricant was applied, thereby a patterned medium was obtained.

The manufactured medium was mounted to a drive to conduct a fringe test. An error ratio measurement was performed after 1000 times of adjacent recordings on the medium having a magnetic land width of 54 nm, a groove width of 16 nm, a magnetic write width (MWW) of 80 nm, and a magnetic read width (MRW) of 50 nm, and the error ratio was $10^{-5}$ or less. Thus, it was confirmed that the medium properly operated as a DTR medium.

Example 2

A magnetic recording medium was manufactured by the method shown in FIGS. 10A, 10B, 10C, 10D, 10E, 10F, 10G, 10H, 10I, and 10J. Further, performance thereof was evaluated.

As shown in FIG. 10A, a soft magnetic layer (CoZrNb) (not shown) having a thickness of 40 nm, an orientation controlling underlayer (Ru) (not shown) having a thickness Of 20 nm, a magnetic recording layer 2 (CoCrPt—$SiO_2$) having a thickness of 20 nm, a DLC layer 3 having a thickness of 2 nm, a first hard mask (Mo) 4 having a thickness of 3 nm, a second hard mask (C) 5 having a thickness of 2 nm, and a third hard mask (Si) 6 having a thickness of 3 nm were formed on a glass substrate 1. A resist 7 was spin-coated on the third hard mask 6 in such a manner that a thickness thereof becomes 80 nm. A stamper was disposed in such a manner that a protrusion-recess surface thereof is opposed to the resist 7.

As shown in FIG. 10B, the stamper was imprinted on the resist 7 to print the patterns of protrusions and recesses of the stamper on the resist 7. After that, the stamper was removed. A resist residue remained at the bottom of the recesses of the patterns printed on the resist 7.

As shown in FIG. 10C, the resist residue in the recesses was removed by dry etching to expose a surface of the third hard mask 6. The step was performed by means of an ICP-RIE system using $CF_4$ as a process gas at a chamber pressure of 0.1 Pa and coil RF power and platen RF power of 100 W and 50 W, respectively, for an etching time of 60 seconds.

As shown in FIG. 10D, the pattern was printed on the third hard mask 6 by ion beam etching using the patterned resist 7 as a mask to expose the second hard mask 5 at the recesses of the mask. The step was performed by means of an ICP-RIE system using $CF_4$ as a process gas at a chamber pressure of 0.1 Pa and coil RF power and platen RF power of 100 W and 50 W, respectively, for an etching time of 20 seconds.

As shown in FIG. 10E, the pattern was printed by etching the second hard mask 5 formed of C by using the patterned third hard mask 6 as a mask to expose a surface of the first hard mask 4 at the recesses. The step was performed by means of an ICP-RIE system using $O_2$ as a process gas at a chamber pressure of 0.1 Pa and coil RF power and platen RF power of 100 W and 50 W, respectively, for an etching time of 20 seconds.

As shown in FIG. 10F, an implantation depth-adjusting layer 9 of Cr having a thickness of 30 nm was formed on the medium in which the patterns of protrusions and recesses were formed above the first hard mask 4.

As shown in FIG. 10G, magnetism of a region of the magnetic recording layer 2 corresponding to the recesses of the mask was deactivated via the implantation depth-adjusting layer 9 formed of Cr, the first hard mask 4 formed of Mo, and the DLC layer 3. Thus, a nonmagnetic region 8 was formed on the magnetic recording layer 2. The magnetism deactivation is performed by means of an ECR ion gun using a gaseous mixture of He and $N_2$ having a partial pressure ratio of 1:1 at a gas pressure of 0.04 Pa, microwave power of 1000 W, and a compression voltage of 5000 V for a processing time of 100 seconds.

As shown in FIG. 10H, the remaining implantation depth-adjusting layer 9 was removed. The step was performed by means of an RIE system using $Cl_2$ as a process gas at a chamber pressure of 1 Pa and power of 400 W for an etching time of 20 seconds.

As shown in FIG. 10I, the remaining first hard mask (Mo) 4 was removed together with the layer above the first hard mask 4. The step was performed by immersing the medium into a hydrogen peroxide solution and retaining the medium in the solution for one minute. Thus, the first hard mask 4 was released from the DLC layer 3. Further, the surface was cleaned using $H_2$ plasma.

As shown in 10J, a protective layer 11 was formed by CVD, and a lubricant was applied, thereby a patterned medium was obtained.

The manufactured medium was mounted to a drive to conduct a fringe test. An error ratio measurement was performed after 1000 times of adjacent recordings on the medium having a magnetic land width of 54 nm, a groove width of 16 nm, a magnetic write width (MWW) of 80 nm, and a magnetic read width (MRW) of 50 nm, and the error ratio was $10^{-5}$ or less. Thus, it was confirmed that the medium properly operated as a DTR medium.

Example 3

A magnetic recording medium was manufactured by the method shown in FIGS. 11A, 11B, 11C, 11D, 11E, 11F, 11G, 11H, 11I, 11J, and 11K. Further, performance thereof was evaluated.

The layer formation and the pattern formation of each layer were performed as shown in FIGS. 11A, 11B, 11C, 11D, and 11E. These steps were performed in the same manner as in the steps shown in FIGS. 10A, 10B, 10C, 10D, and 10E of Example 2. In this Example, the DLC layer 3 having a thickness of 3 nm was formed.

As shown in FIG. 11F, a pattern was printed by etching a first hard mask 4 formed of Mo by using a patterned second hard mask 5 as a mask to expose a surface of a DLC layer 3 at recesses. The processing was performed by means of an ion milling system using Ar as a process gas at a chamber pressure of 0.05 Pa and an acceleration voltage of 400 V for a processing time of 10 seconds.

As shown in FIG. 11G, the pattern was printed by etching the DLC layer 3 by using the patterned first hard mask 4 as a mask to expose a surface of the magnetic recording layer 2 at the recesses. The processing was performed by means of an ICP-RIE system using $O_2$ as a process gas at a chamber pressure of 0.1 Pa and coil RF power and platen RF power of 100 W and 50 W, respectively, for an etching time 20 seconds.

As shown in FIG. 11H, an implantation depth-adjusting layer 9 of W having a thickness of 30 nm was formed on the medium in which the patterns of protrusions and recesses are formed above the magnetic recording layer 2.

As shown in FIG. 11I, magnetism of a region of the magnetic recording layer 2 corresponding to the recesses of the mask was deactivated via the implantation depth-adjusting layer 9 formed of W. The step was performed by means of an ECR ion gun using gaseous $N_2$ at a gas pressure of 0.04 Pa, microwave power of 1000 W, and a compression voltage of 5000 V for a processing time of 50 seconds. By this processing, the film thickness of the implantation depth-adjusting layer 9 was reduced from 30 nm to 2 nm.

As shown in FIG. 11J, the remaining first hard mask (Mo) 4 was removed together with the layer above the first hard mask 4. The step was performed by immersing the medium into a hydrogen peroxide solution and retaining the medium in the solution for one minute. Thus, the first hard mask 4 was released from the PLC layer 3, and the implantation depth-adjusting layer 9 was left on the nonmagnetic regions of the magnetic recording layer 2 with the PLC layer 3 being left on regions in which magnetism was maintained. The film thickness of the remaining PLC layer 3 was 3 nm, and the film thickness of the implantation depth-adjusting layer 9 was 2 nm, thereby a difference between protrusions and recesses is 1 nm.

As shown in 11K, a protective layer 11 was formed by CVD, and a lubricant was applied, thereby a patterned medium was obtained.

The manufactured medium was mounted to a drive to conduct a fringe test. An error ratio measurement was performed after 1000 times of adjacent recordings on the medium having a magnetic land width of 54 nm, a groove width of 16 nm, a magnetic write width (MWW) of 80 nm, and a magnetic read width (MRW) of 50 nm, and the error ratio was $10^{-5}$ or less. Thus, it was confirmed that the medium properly operated as a DTR medium.

Example 4

A magnetic recording medium was manufactured by the method shown in FIGS. 12A, 12B, 12C, 12D, 12E, 12F, 12G, 12H, 12I, 12J, and 12K. Further, the performance thereof was evaluated.

The layer formation and the pattern formation of each layer were performed as shown in FIGS. 12A, 12B, 12C, 12D, and 12E. These steps were performed in the same manner as in the steps shown in FIGS. 10A, 10B, 10C, 10D, and 10E of Example 2. In this Example, the DLC layer 3 having a thickness of 3 nm was formed.

As shown in FIG. 12F, a pattern was printed by etching a first hard mask 4 formed of Mo by using a patterned second hard mask 5 as a mask to expose a surface of a DLC layer 3 at recesses. The processing was performed by means of an ion milling system using Ar as a process gas at a chamber pressure of 0.05 Pa and an acceleration voltage of 400 V for a processing time of 10 seconds.

As shown in FIG. 12G, the pattern was printed by etching the DLC layer 3 by using the patterned first hard mask 4 as a mask to expose a surface of the magnetic recording layer 2 at the recesses. The processing was performed by means of an ICP-RIE system using $O_2$ as a process gas at a chamber pressure of 0.1 Pa and coil RF power and platen RF power of 100 W and 50 W, respectively, for an etching time of 20 seconds.

As shown in FIG. 12H, an implantation depth-adjusting layer 9 of W having a thickness of 25 nm was formed on the medium in which the patterns of protrusions and recesses are formed above the magnetic recording layer 3.

As shown in FIG. 12I, magnetism of a region of the magnetic recording layer 2 corresponding to the recesses of the mask was deactivated via the implantation depth-adjusting layer 9 formed of W. The step was performed by means of an ECR ion gun using gaseous $N_2$ at a gas pressure of 0.04 Pa, microwave power of 1000 W, and a compression voltage of 5000 V for a processing time of 50 seconds. By this processing, the entire implantation depth-adjusting layer 9 was etched, and 3 nm of the magnetic recording layer 2 was etched.

As shown in FIG. 12J, the remaining first hard mask (Mo) 4 was removed together with the layer above the first hard mask 4. The step was performed by immersing the medium into a hydrogen peroxide solution and retaining the medium in the solution for one minute. Thus, the first hard mask 4 was released from the PLC layer 3, and the PLC layer 3 remained on regions of the magnetic recording layer 2 in which magnetism was maintained. The film thickness of the remaining DLC layer 3 was 3 nm, and 3 nm of a surface of a nonmagnetic region 8 had been etched, thereby a difference between protrusions and recesses is 6 nm.

As shown in 12K, a protective layer 11 was formed by CVD, and a lubricant was applied, thereby a patterned medium was obtained.

The manufactured medium was mounted to a drive to conduct a fringe test. An error ratio measurement was performed after 1000 times of adjacent recordings on the medium having a magnetic land width of 54 nm, a groove width of 16 nm, a magnetic write width (MWW) of 80 nm, and a magnetic read width (MRW) of 50 nm, and the error ratio was $10^{-5}$ or less. Thus, it was confirmed that the medium properly operated as a DTR medium.

Example 5

DTR media were manufactured in the same manner as in Example 1 except for changing the film thickness of the first hard mask 4 used also as the implantation depth-adjusting layer and formed of Mo to 5 nm, 10 nm, 20 nm, 30 nm, and 40 nm in the step of FIG. 3A and stopping the etching step in FIG. 3F so as to remain the first hard masks 4 each having the film thickness of 1 to 5 nm.

Also, as Comparative Example 1, a medium was manufactured by performing the steps of FIGS. 3A, 3B, 3C, 3D, and 3E in the same manner as in Example 1, etching the first hard mask 4 used also as the implantation depth-adjusting layer and formed of Mo, and the DLC layer 3, and performing the magnetization deactivation in the same manner as in Example 2.

Each of the manufactured media was mounted to a drive to conduct a fringe test. An error ratio measurement was performed after 1000 times of adjacent recordings on the medium having a magnetic land width of 54 nm, a groove width of 16 nm, a magnetic write width (MWW) of 80 nm, and a magnetic read width (MRW) of 50 nm. Further, Ms of each of the nonmagnetic regions of the media was measured by VSM. Results are shown in Table 1.

TABLE 1

Implantation depth-adjusting layer film thickness and medium characteristics

| Film thickness [nm] | He—N$_2$ irradiation time [sec] | Nonmagnetic region Ms (%) | ER (10$^x$) |
|---|---|---|---|
| 5 | 20 | 20 | −5.0 |
| 10 | 30 | 10 | −5.2 |
| 20 | 40 | 0 | −6.0 |
| 30 | 60 | 0 | −6.7 |
| 40 | 75 | 0 | −6.5 |
| 0 (Comparative Example 1) | 10 | 50 | Impossible to measure |

From the results of the error ratios ER, it is confirmed that the medium provided with the implantation depth-adjusting layer for the magnetism deactivation exhibits excellent performance as the DTR medium. Also, from the results of Ms, it is confirmed that the sufficient deactivation is attained in the medium provided with the implantation depth-adjusting layer for the magnetism deactivation as compared to Comparative Example 1.

Media were manufactured according to Examples 2, 3, and 4 by changing the thickness of the implantation depth-adjusting layer and compared with Comparative Example. As a result, it is confirmed that the error ratio is suppressed since sufficient magnetism deactivation as in the media of Example 1 is enabled by the provision of the implantation depth-adjusting layer.

Example 6

DTR media were manufactured in the same manner as in Example 1 except for stopping the ion beam irradiation in the step of the magnetism deactivation of FIG. 3F so that the film thicknesses of the remaining implantation depth-adjusting layers were 20, 10, 5, and 2 nm.

Also, as Comparative Example 2, a DTR medium was manufactured using such gas used in Example 2 and performing ion implantation at energy of 30 keV in the step of the magnetism deactivation of FIG. 3F. The film thickness of the implantation depth-adjusting layer is not reduced when the ion implantation at high energy is performed.

Each of the manufactured media was mounted to a drive to conduct a fringe test. An error ratio measurement was performed after 1000 times of adjacent recordings on the medium having a magnetic land width of 54 nm, a groove width of 16 nm, a magnetic write width (MW) of 80 nm, and a magnetic read width (MRW) of 50 nm. Further, Ms of each of the nonmagnetic regions of the media was measured by VSM. Results are shown in Table 2.

TABLE 2

Implantation depth-adjusting layer film thickness and medium characteristics

| Film thickness reduced amount [nm] | Remaining film thickness [nm] | He—N$_2$ irradiation time [sec] | Nonmagnetic region Ms (%) | ER (10$^x$) |
|---|---|---|---|---|
| 10 | 20 | 30 | 10 | −5.2 |
| 20 | 10 | 45 | 0 | −5.9 |
| 25 | 5 | 50 | 0 | −6.5 |
| 28 | 2 | 65 | 0 | −6.3 |
| 0 (Comparative Example 2) | 30 | 30 | 0 | Impossible to measure |

In the media according to the embodiment, the magnetism was sufficiently deactivated to attain the good error ratio. In contrast, in Comparative Example 2, though the magnetism was sufficiently deactivated, it was impossible to measure the error ratio. As a result of investigation of the medium taken out from the drive, it was detected that damage was laterally broadened because of the high-energy ion implantation. From the above results, it is confirmed that it is possible to perform patterning of a medium without any lateral damage by irradiating the ion beam at the low energy while reducing the film thickness of the implantation depth-adjusting layer.

Media were manufactured according to Examples 2, 3, and 4 by changing the thickness of the implantation depth-adjusting layer and compared with Comparative Example. As a result, it is confirmed that the lateral damage does not occur, the magnetism is sufficiently deactivated, and the error ratio is suppressed since sufficient magnetism deactivation as in the media of Example 1 is enabled by performing the deactivation while reducing the film thickness of the implantation depth-adjusting layer.

Example 7

DTR media were manufactured in the same manner as in Example 1 except for using He, Ne, Ar, Kr, Xe, $N_2$, $O_2$, $H_2$, a gaseous mixture of He—$N_2$, a gaseous mixture of Ne—$H_2$, and a gaseous mixture of Ar—$O_2$, the ion beam to be irradiated in the step of FIG. 3A. Also, the irradiation energy was changed to the condition which does not cause any lateral damage. As a comparative example, Comparative Example 1 was manufactured.

Each of the manufactured media was mounted to a drive to conduct a fringe test. An error ratio measurement was performed after 1000 times of adjacent recordings on the medium having a magnetic land width of 54 nm, a groove width of 16 nm, a magnetic write width (MWW) of 80 nm, and a magnetic read width (MRW) of 50 nm. Further, Ms of each of the nonmagnetic regions of the media was measured by VSM. Results are shown in Table 3.

TABLE 3

Implantation depth-adjusting layer film thickness and medium characteristics

| Gas type | Remaining film thickness [nm] | Ion beam irradiation time [sec] | Nonmagnetic region Ms (%) | ER ($10^x$) |
|---|---|---|---|---|
| He | 5 | 200 | 10 | −5.2 |
| Ne | 5 | 120 | 3 | −5.5 |
| Ar | 5 | 30 | 0 | −6.0 |
| Kr | 5 | 22 | 0 | −6.3 |
| Xe | 5 | 15 | 0 | −6.4 |
| $N_2$ | 5 | 30 | 0 | −6.6 |
| $O_2$ | 5 | 30 | 0 | −6.1 |
| $H_2$ | 5 | 200 | 0 | −5.3 |
| He—$N_2$ | 5 | 50 | 0 | −6.5 |
| Ne—$H_2$ | 5 | 100 | 5 | −5.3 |
| Ar—$O_2$ | 5 | 20 | 0 | −6.0 |
| 0 (Comparative Example 1) | 0 (Without implantation depth-adjusting layer) | | 10 | 50 Impossible to measure |

In the media according to the embodiment, the magnetism was sufficiently deactivated to attain the good error ratio. In contrast, in Comparative Example 1, it was impossible to reduce Ms of the nonmagnetic region to zero, and it was impossible to measure the error ratio. It was confirmed that the media according to the embodiment exhibited excellent performance even in the case of using the different gases for the ion beam.

Media were manufactured according to Examples 2, 3, and 4 by changing the type of gas to be used and compared with Comparative Example. As a result, as in the media of Example 1, it is confirmed that the excellent performance is exhibited even in the case of using the different gases.

Example 8

DTR media were manufactured in the same manner as in Example 2 except for using C, $C_{0.9}N_{0.1}$, Si, $SiO_2$, $Si_3N_4$, $Si_5C_{19}$, Ag, Au, Cu, Pd, Pt, Ru, CoPt, CoCrPt, CoCrPt—$SiO_2$, Al, Cr, Hf, Mo, Nb, Ta, Ti, V, W, and Zr for the materials of the implantation depth-adjusting layers to be formed in the step of FIG. 10F. Also, the release of the implantation depth-adjusting layer was appropriately changed depending on the material used for the implantation depth-adjusting layer as shown in Table 4. As a comparative example, Comparative Example 1 was manufactured.

Each of the manufactured media was mounted to a drive to conduct a fringe test. An error ratio measurement was performed after 1000 times of adjacent recordings on the medium having a magnetic land width of 54 nm, a groove width of 16 nm, a magnetic write width (MWW) of 80 nm, and a magnetic read width (MRW) of 50 nm. Further, Ms of each of the nonmagnetic regions of the media was measured by VSM. Results are shown in Table 4.

TABLE 4

Implantation depth-adjusting layer film thickness and medium characteristics

| Implantation depth-adjusting layer | Ion beam irradiation time [sec] | Implantation depth-adjusting layer release method | Nonmagnetic region Ms (%) | ER ($10^x$) |
|---|---|---|---|---|
| C | 50 | $O_2$ RIE | 5 | −5.3 |
| $C_{0.9}N_{0.1}$ | 50 | $O_2$ RIE | 3 | −5.5 |
| Si | 200 | $CF_4$ RIE | 0 | −5.9 |
| $SiO_2$ | 200 | $CF_4$ RIE | 0 | −5.8 |
| $Si_3N_4$ | 200 | $CF_4$ RIE | 0 | −5.9 |
| $Si_5C_{19}$ | 100 | $CF_4$ RIE | 5 | −5.3 |
| Ag | 30 | Ar Ion Beam | 10 | −5.1 |
| Au | 30 | Ar Ion Beam | 10 | −5.2 |
| Cu | 30 | Ar Ion Beam | 10 | −5.2 |
| Pd | 30 | Ar Ion Beam | 0 | −6.3 |
| Pt | 30 | Ar Ion Beam | 0 | −6.4 |
| Ru | 30 | Ar Ion Beam | 3 | −6.0 |
| CoPt | 30 | Ar Ion Beam | 0 | −6.4 |
| CoCrPt | 30 | Ar Ion Beam | 0 | −6.6 |
| CoCrPt—$SiO_2$ | 30 | Ar Ion Beam | 0 | −6.6 |
| Al | 60 | $CF_4$ RIE | 0 | −6.4 |
| Cr | 50 | $Cl_2$ RIE | 0 | −6.6 |
| Hf | 50 | Ar Ion Beam | 0 | −6.6 |
| Mo | 60 | $H_2O_2$ (Wet) | 0 | −6.7 |
| Nb | 50 | Ar Ion Beam | 0 | −6.0 |
| Ta | 60 | $CF_4$ RIE | 0 | −6.1 |
| Ti | 60 | $CF_4$ RIE | 0 | −6.3 |
| V | 60 | $CF_4$ RIE | 0 | −6.5 |
| W | 60 | $CF_4$ RIE | 0 | −6.7 |
| Zr | 60 | $CF_4$ RIE | 0 | −6.6 |
| None (Comparative Example 1) | 10 | 0 (Without, implantation depth-adjusting layer) | 50 | Impossible to measure |

In the media according to the embodiment, the magnetism was sufficiently deactivated to attain the good error ratio. In contrast, in Comparative Example 1, it was impossible to reduce Ms of the nonmagnetic region to zero, and it was impossible to measure the error ratio. It was confirmed that the media according to the embodiment exhibited excellent performance even in the case of using the different materials for the implantation depth-adjusting layer.

Media were manufactured according to Examples 1, 3, and 4 by changing the type of material to be used and compared with Comparative Example. As a result, it is confirmed that the excellent performance is exhibited as in the media of Example 2 even in the case of using the different materials for the implantation depth-adjusting layer.

Example 9

A magnetic recording medium was manufactured in the same manner as in Example 1 except for stacking Ta for 10 nm as a second implantation depth-adjusting layer between the first hard mask (Mo) 4 and the second hard mask (C) 5 as an implantation depth-adjusting layer and release layer, and reducing the thickness of Mo to 5 nm. Further, performance thereof was evaluated.

As shown in FIG. 3A, a soft magnetic layer (CoZrNb) (not shown) having a thickness of 40 nm, an orientation controlling underlayer (Ru) (not shown) having a thickness of 20 nm, a magnetic recording layer 2 (CoCrPt—$SiO_2$) having a thickness of 20 nm, a DLC protective layer 3 having a thickness of 2 nm, a first hard mask (Mo) 4 having a thickness of 5 nm, the second implantation depth-adjusting layer (Ta) (not shown) having a thickness of 5 nm, a second hard mask (C) 5 having a thickness of 30 nm, and a third hard mask (Si) 6 having a thickness of 3 nm were formed on a glass substrate 1. A resist 7 was spin-coated on the third hard mask 6 in such a manner that a thickness thereof becomes 80 nm. A stamper was disposed in such a manner that a protrusion-recess surface thereof is opposed to the resist 7.

As shown in FIG. 3B, the stamper was imprinted on the resist 7 to print the patterns of protrusions and recesses of the stamper on the resist 7. After that, the stamper was removed. A resist residue remained at the bottom of the recesses of the patterns printed on the resist 7.

As shown in FIG. 3C, the resist residue in the recesses was removed by dry etching to expose a surface of the third hard mask 6. The step was performed by means of an ICP-RIE system using $CF_4$ as a process gas at a chamber pressure of 0.1 Pa and coil RF power and platen RF power of 100 W and 50 W, respectively, for an etching time of 60 seconds.

As shown in FIG. 3D, the pattern was printed on the third hard mask 6 by ion beam etching using the patterned resist 7 as a mask to expose the second hard mask 5 at the recesses. The step was performed by means of an ICP-RIE system using $CF_4$ as a process gas at a chamber pressure of 0.1 Pa and coil RF power and platen RF power of 100 W and 50 W, respectively, for an etching time of 20 seconds.

As shown in FIG. 3E, the pattern was printed by etching the second hard mask 5 formed of C by using the patterned third hard mask 6 as a mask to expose a surface of the first hard mask 4 at the recesses. The step was performed by means of an ICP-RIE system using $O_2$ as a process gas at a chamber pressure of 0.1 Pa and coil RF power and platen RF power of 100 W and 50 W, respectively, for an etching time of 30 seconds.

As shown in FIG. 3F, a region of the magnetic recording layer 2 corresponding to the recesses of the mask was deactivated via the second deactivation depth adjustment layer formed of Ta, the first hard mask 4 formed of Mo, and the DLC layer 3. Thus, a nonmagnetic region 8 was formed on the magnetic recording layer 2. The magnetism deactivation was performed by means of an ECR ion gun using gaseous $N_2$ at a gas pressure of 0.04 Pa, microwave power of 1000 W, and a compression voltage of 5000 V for a processing time of 60 seconds. The entire Ta was removed by the etching.

As shown in FIG. 3G, the remaining first hard mask (Mo) 4 was removed together with the layer above the first hard mask 4. The step was performed by immersing the medium into a hydrogen peroxide solution and retaining the medium in the solution for one minute. Thus, the first hard mask 4 was released from the DLC layer 3.

As shown in 3H, a protective layer 11 was formed by CVD, and a lubricant was applied, thereby a patterned medium was obtained.

The manufactured medium was mounted to a drive to conduct a fringe test. An error ratio measurement was performed after 1000 times of adjacent recordings on the medium having a magnetic land width of 54 nm, a groove width of 16 nm, a magnetic write width (MWW) of 80 nm, and a magnetic read width (MRW) of 50 nm, and it was confirmed that the error ratio was $10^{-5}$ or less and property operation as a DTR medium was attained. Thus, it was confirmed that the medium in which the two layers of Mo and Ta were provided as the deactivation depth adjustment layers was properly manufactured and driven.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method of manufacturing a patterned medium, comprising:
    forming a diamond-like carbon film above a magnetic recording layer before forming an implantation depth-adjusting layer;
    forming the implantation depth-adjusting layer above the magnetic recording layer, wherein the magnetic recording layer comprises a material that is deactivated when implanted with a chemical species, and wherein the implantation depth-adjusting layer comprises at least one material that is etched when irradiated with an ion beam of the chemical species and selected from the group consisting of Ag, Au, Cu, Pd, Pt, Ru, CoPt, CoCrPt, CoCrPt—$SiO_2$, Al, Cr, Hf, Mo, Nb, Ta, Ti, V, W and Zr; and
    irradiating the implantation depth-adjusting layer with the ion beam to implant the chemical species into a part of the magnetic recording layer through the implantation depth-adjusting layer while etching the implantation depth-adjusting layer to decrease a thickness of the implantation depth-adjusting layer.

2. The method of claim 1, wherein the ion beam irradiation is continued until the thickness of the implantation depth-adjusting layer is so decreased that an ion beam implantation depth of the chemical species exceeds a lower surface of the magnetic recording layer.

3. The method of claim 1, wherein the thickness of the implantation depth-adjusting layer at the start of the ion beam irradiation is such that an ion beam implantation depth of the chemical species is between an upper and a lower surface of the magnetic recording layer.

4. The method of claim 1, wherein the thickness of the implantation depth-adjusting layer at the start of the ion beam irradiation is such that an ion beam implantation depth of the chemical species is above the magnetic recording layer.

5. The method of claim 1, wherein the ion beam irradiation is continued until a part of the implantation depth-adjusting layer above the part of the magnetic recording layer implanted with the chemical species is completely removed.

6. The method of claim 1, wherein the ion beam irradiation is terminated before a part of the implantation depth-adjusting layer above the part of the magnetic recording layer implanted with the chemical species is completely removed, and the method further comprises removing a residual portion of the implantation depth-adjusting layer after the ion beam irradiation.

7. The method of claim 1, further comprising forming a patterned layer as a mask above the implantation depth-adjusting layer before the ion beam irradiation.

8. The method of claim 1, further comprising forming a patterned layer as a mask above the magnetic recording layer before forming the implantation depth-adjusting layer.

9. The method of claim 1, further comprising:
forming a patterned layer as a mask above the implantation depth-adjusting layer before the ion beam irradiation; and
dissolving the implantation depth-adjusting layer in a liquid after the ion beam irradiation to lift off the mask.

10. The method of claim 1, further comprising:
forming a release layer above the diamond-like carbon film before forming the implantation depth-adjusting layer;
forming a patterned layer as a mask above the implantation depth-adjusting layer before the ion beam irradiation; and
dissolving the release layer in a liquid after the ion beam to lift off the implantation depth-adjusting layer and the mask.

11. The method of claim 1, further comprising:
forming a release layer above the diamond-like carbon film before forming the implantation depth-adjusting layer;
forming a patterned layer as a mask above the release layer before forming the implantation depth-adjusting layer; and
dissolving the release layer in a liquid after the ion beam irradiation to lift off the mask and the implantation depth-adjusting layer.

12. The method of claim 1, wherein an acceleration voltage for the ion beam irradiation is constant during the ion beam irradiation.

13. The method of claim 1, wherein the chemical species is originated from a gas selected from the group consisting of He, Ne, Ar, Kr, Xe, $N_2$, $O_2$ and $H_2$ or a mixture thereof.

14. A method of manufacturing a patterned medium, comprising:

forming an implantation depth-adjusting layer above a magnetic recording layer, wherein the magnetic recording layer comprises a material that is deactivated when implanted with a chemical species, and wherein the implantation depth-adjusting layer comprises at least one material that is etched when irradiated with an ion beam of the chemical species and selected from the group consisting of Ag, Au, Cu, Pd, Pt, Ru, CoPt, CoCrPt, CoCrPt—SiO2, Al, Cr, Hf, Mo, Nb, Ta, Ti, V, W and Zr; and
irradiating the implantation depth-adjusting layer with the ion beam to implant the chemical species into a part of the magnetic recording layer through the implantation depth-adjusting layer while etching the implantation depth-adjusting layer to decrease a thickness of the implantation depth-adjusting layer,
wherein the thickness of the implantation depth-adjusting layer at the start of the ion beam irradiation is such that an ion beam implantation depth of the chemical species is between an upper and a lower surface of the magnetic recording layer.

15. A method of manufacturing a patterned medium, comprising:
forming a patterned layer as a mask above a magnetic recording layer before forming an implantation depth-adjusting layer;
forming the implantation depth-adjusting layer above the magnetic recording layer, wherein the magnetic recording layer comprises a material that is deactivated when implanted with a chemical species, and wherein the implantation depth-adjusting layer comprises at least one material that is etched when irradiated with an ion beam of the chemical species and selected from the group consisting of Ag, Au, Cu, Pd, Pt, Ru, CoPt, CoCrPt, CoCrPt—SiO2, Al, Cr, Hf, Mo, Nb, Ta, Ti, V, W and Zr; and
irradiating the implantation depth-adjusting layer with the ion beam to implant the chemical species into a part of the magnetic recording layer through the implantation depth-adjusting layer while etching the implantation depth-adjusting layer to decrease a thickness of the implantation depth-adjusting layer.

* * * * *